(12) United States Patent
Siemens et al.

(10) Patent No.: US 9,726,254 B2
(45) Date of Patent: Aug. 8, 2017

(54) TUNED MASS DAMPER

(71) Applicant: ZF FRIEDRICHSHAFEN AG, Friedrichshafen (DE)

(72) Inventors: Kyrill Siemens, Würzburg (DE); Michael Wirachowski, Würzburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/904,390

(22) PCT Filed: Jun. 12, 2014

(86) PCT No.: PCT/EP2014/062173
§ 371 (c)(1),
(2) Date: Jan. 11, 2016

(87) PCT Pub. No.: WO2015/003867
PCT Pub. Date: Jan. 15, 2015

(65) Prior Publication Data
US 2016/0131220 A1    May 12, 2016

(30) Foreign Application Priority Data
Jul. 9, 2013    (DE) .......................... 10 2013 213 373

(51) Int. Cl.
*F16F 15/14* (2006.01)
*F16F 7/10* (2006.01)

(52) U.S. Cl.
CPC .............. *F16F 15/145* (2013.01); *F16F 7/10* (2013.01)

(58) Field of Classification Search
CPC . F16F 15/14; F16F 15/145; F16F 7/10; Y10T 74/2128
See application file for complete search history.

(56) References Cited

U.S. PATENT DOCUMENTS

2014/0026712 A1* 1/2014 Movlazada ........... F16F 15/145
74/574.2

FOREIGN PATENT DOCUMENTS

| DE | 10 2011 086 526 | 6/2012 |
|---|---|---|
| DE | 10 2011 087 631 | 6/2012 |

(Continued)

*Primary Examiner* — Vishal Sahni
(74) *Attorney, Agent, or Firm* — Cozen O'Connor

(57) ABSTRACT

A tuned mass vibration damper included at least one damper mass and at least one guide component part to movably guide the at least one damper mass. The damper mass has a retaining component part which is at least partially arranged in a receiving recess of the damper mass. The retaining component part has at least one retaining structure and the at least one guide component part has at least one mating retaining structure to limit a movement of the at least one damper mass relative to the at least one guide component part in that the retaining structure and the mating retaining structure come in contact with one another. The at least one damper mass drives the retaining component part during a movement of the damper mass along a circumferential direction and to allow a relative movement of the retaining component part (350) with respect to the damper mass which results in a change in a radial distance of the retaining structure from the axis of rotation. The at least one damper mass and the at least one guide component part prevent the retaining structure and mating retaining structure from coming in contact with one another when an upper threshold speed is exceeded.

8 Claims, 18 Drawing Sheets

(56) References Cited

FOREIGN PATENT DOCUMENTS

| | | |
|---|---|---|
| DE | 10 2011 087 693 | 6/2012 |
| DE | 10 2012 215 078 | 3/2013 |
| WO | WO 2012/083920 | 6/2012 |

\* cited by examiner

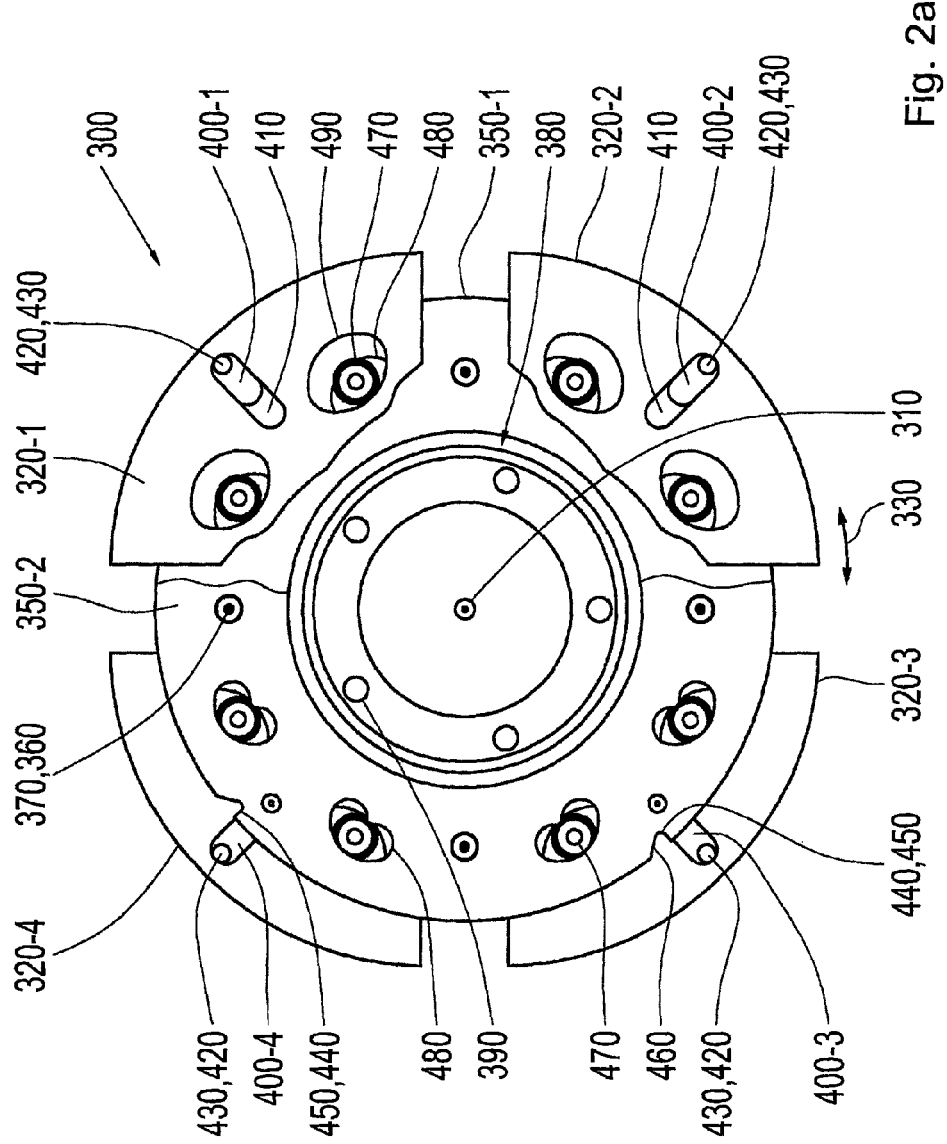

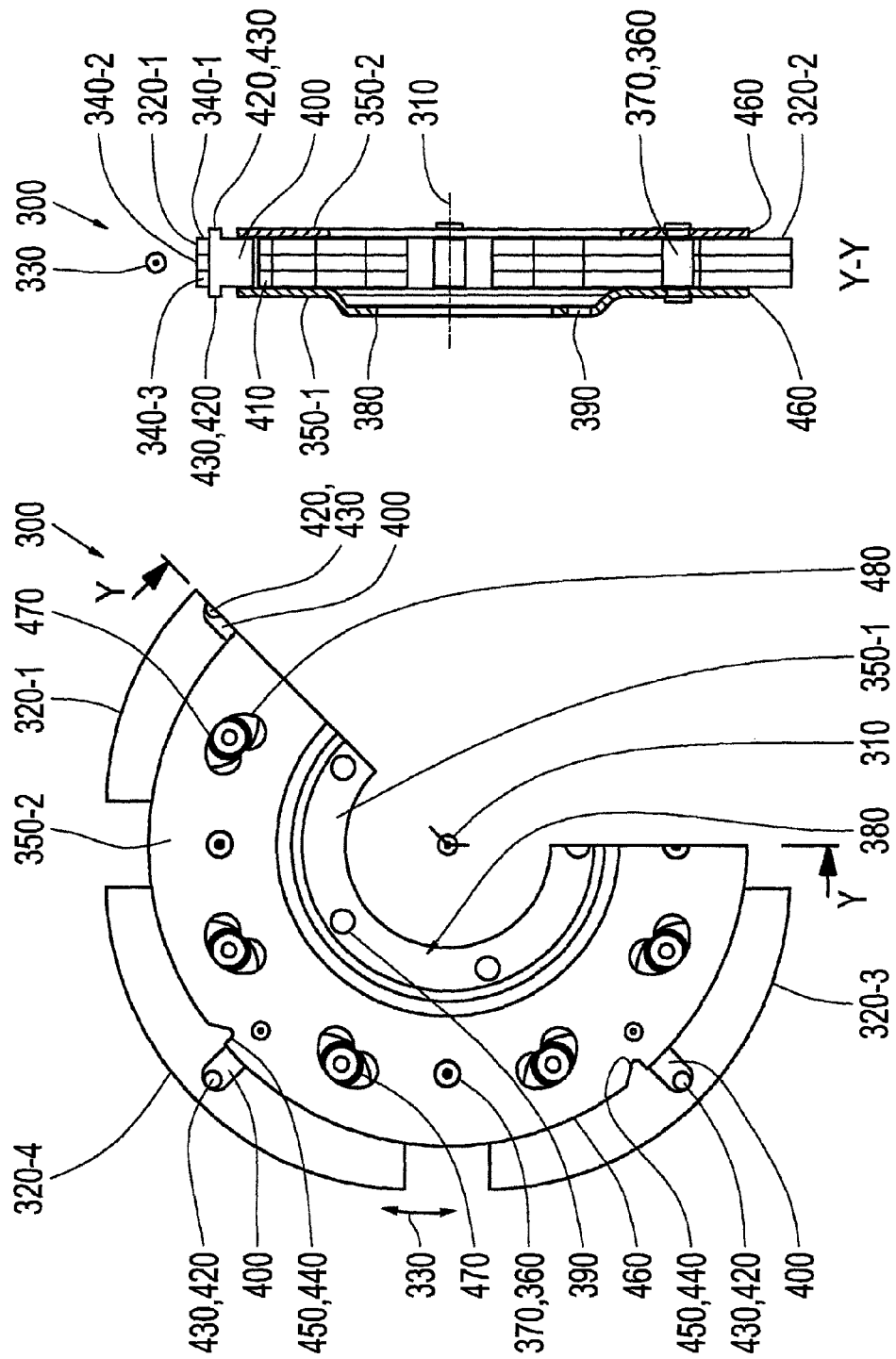

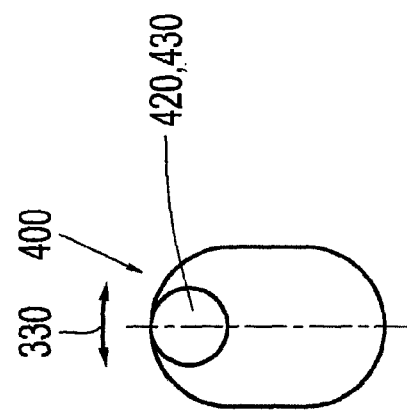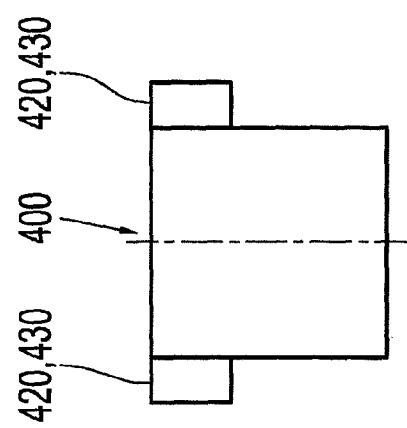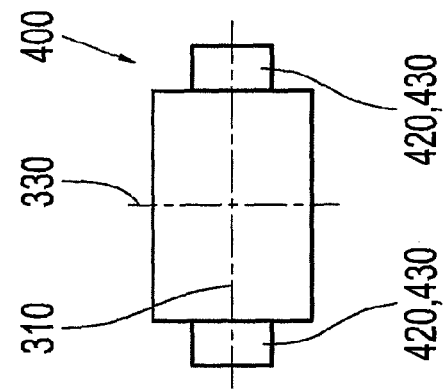

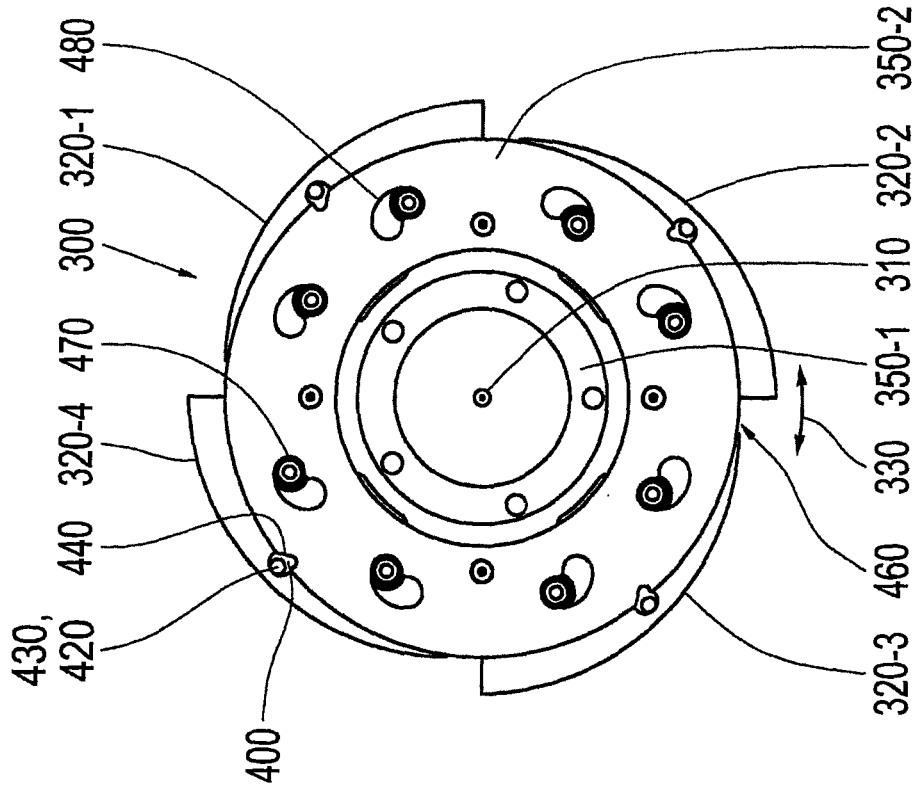
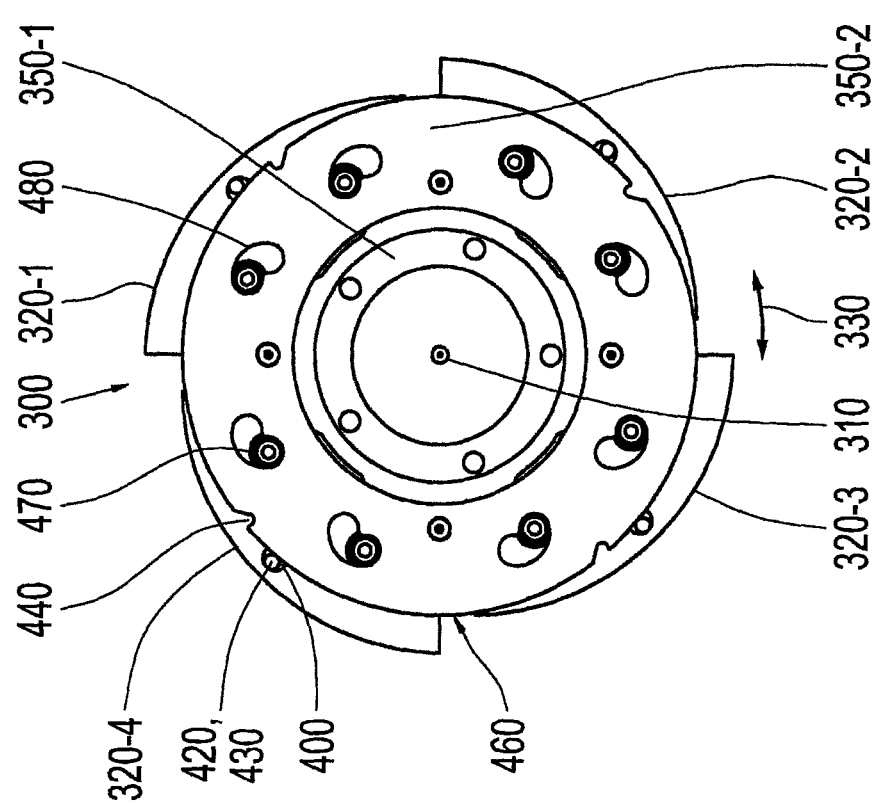

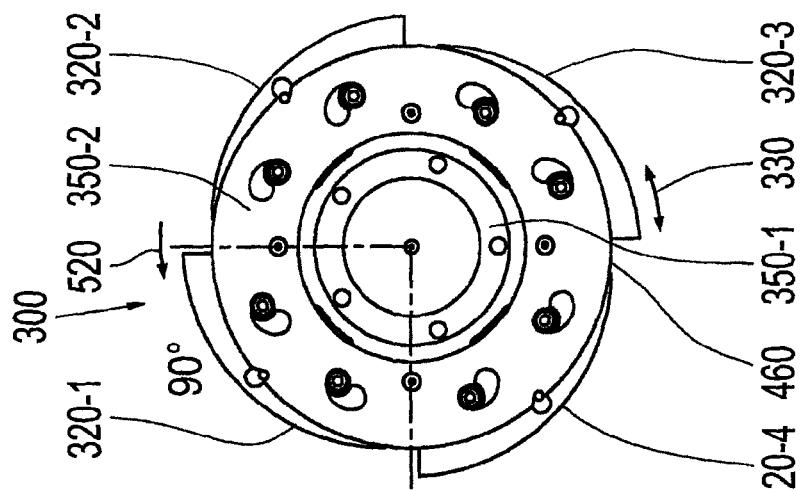
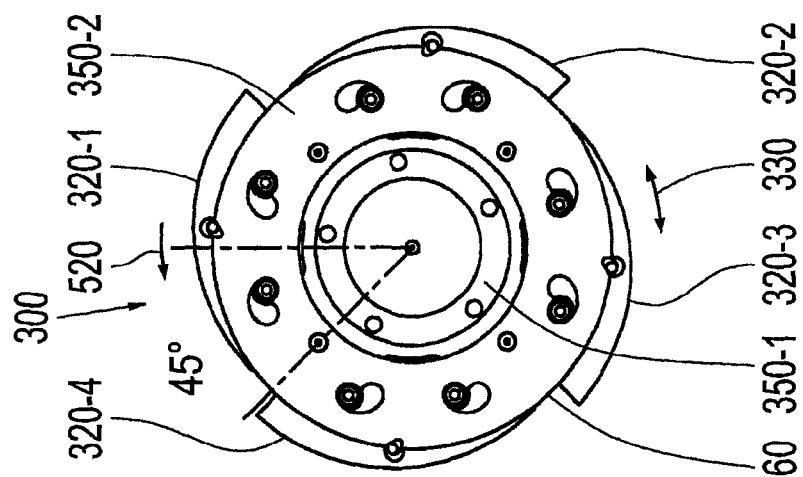
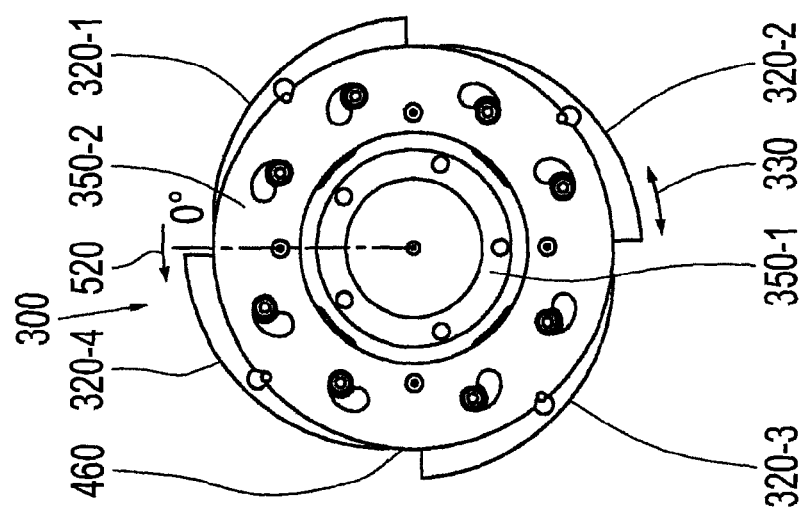

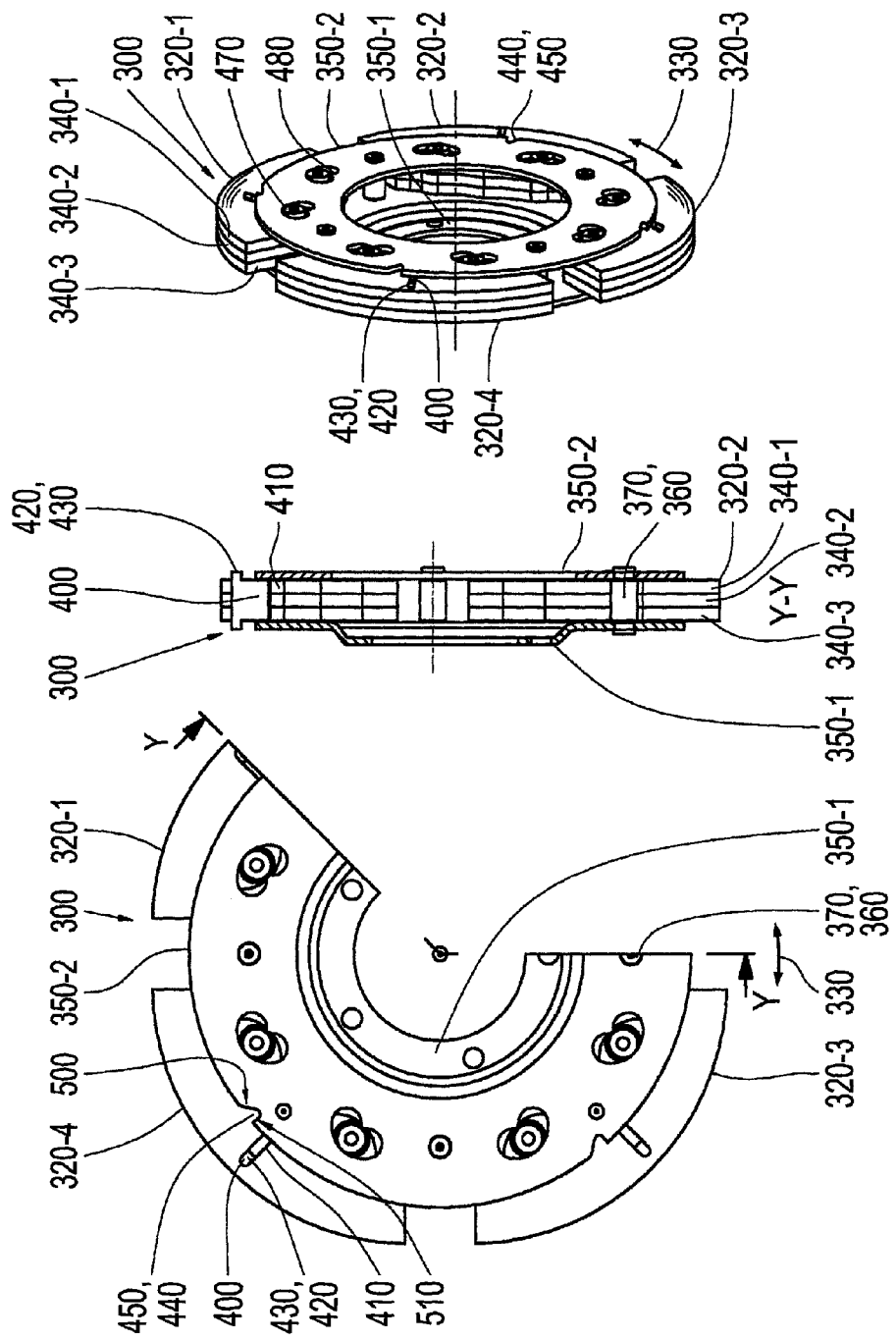

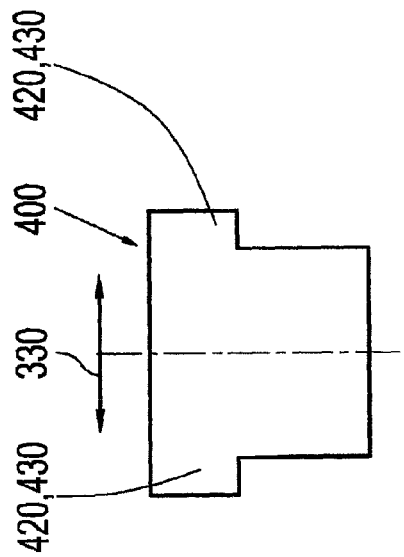
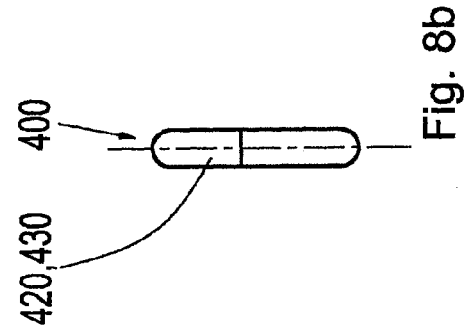
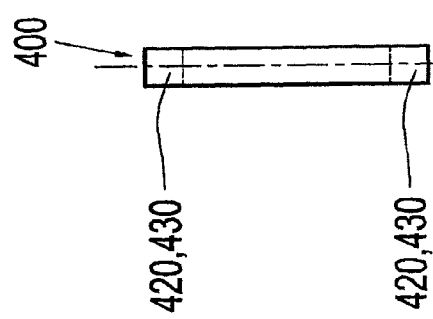

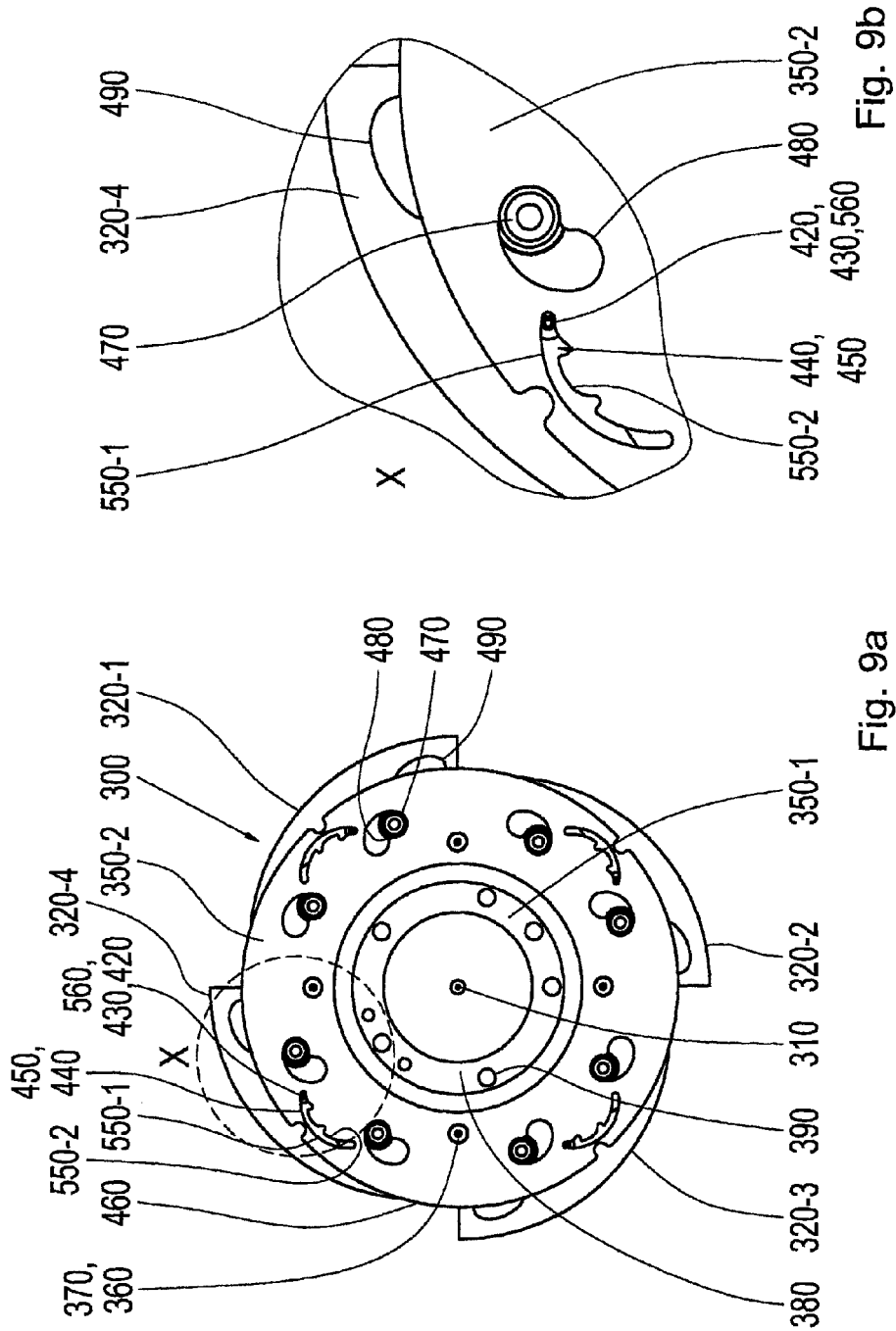

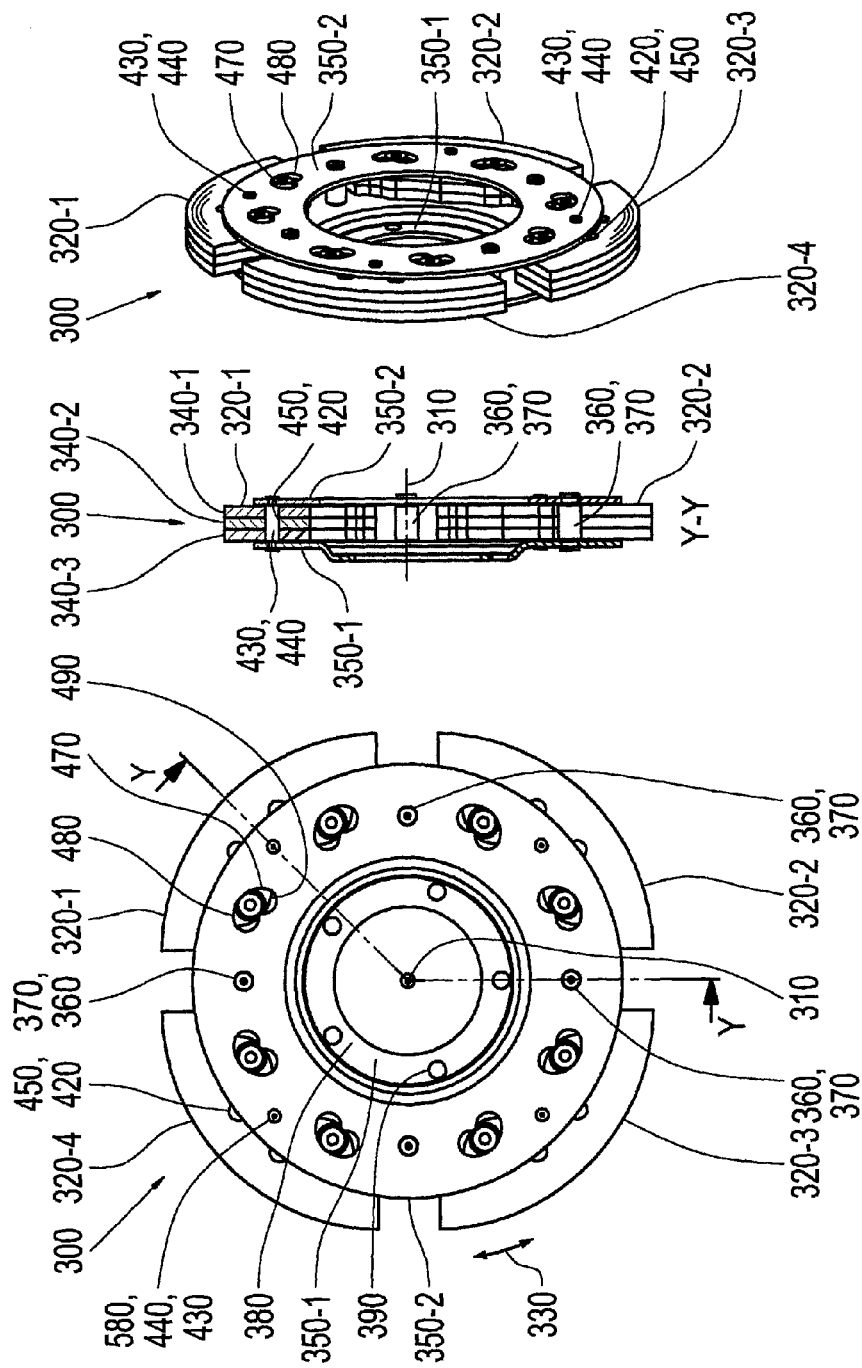

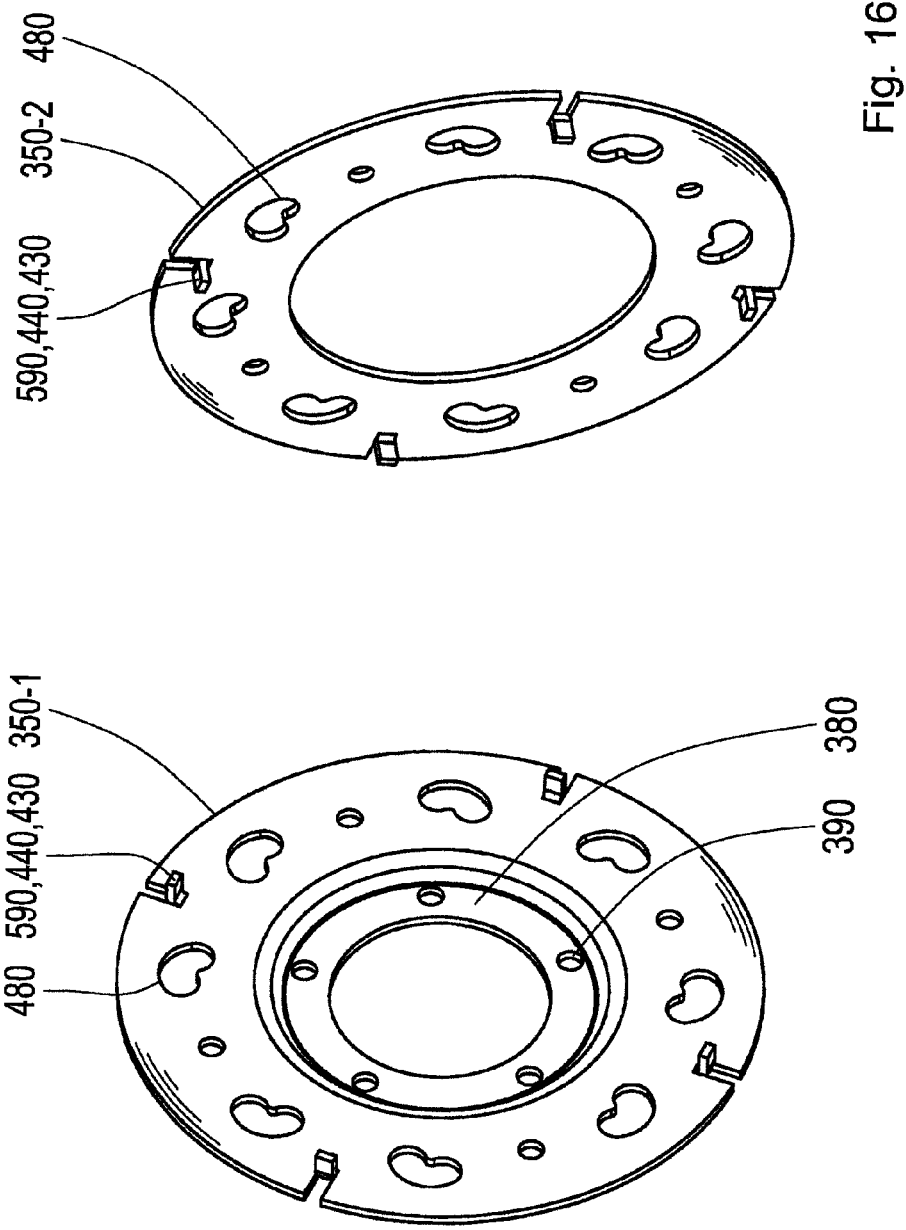

TUNED MASS DAMPER

CROSS REFERENCE TO RELATED APPLICATIONS

This is a U.S. national stage of application No. PCT/EP2014/062173, filed on Jun. 12, 2014. Priority is claimed on German Application No. DE102013213373.1, filed Jul. 9, 2013, the content of which is incorporated here by reference.

BACKGROUND OF THE INVENTION

1. Field of the Invention

A tuned mass vibration damper such as can be used in a drivetrain of a motor vehicle, i.e., for example, within the framework of a start-up element of a motor vehicle, for damping a vibration component of a rotational movement.

2. Detailed Description of the Prior Art

In many areas of machine, plant, and automotive engineering, rotational irregularities occur when rotational movements are transmitted. These rotational irregularities can result, for example, when a rotational movement of this type is coupled into a shaft or also due to changes in the amount of energy or torque taken from the shaft and the rotational movement of the shaft.

An example is a drivetrain of motor vehicle, i.e., for example, drivetrains of passenger cars, trucks or other utility vehicles, in which an internal combustion engine is used as drive motor. Because of its principle of operation, an engine of this kind often has discontinuous torque peaks coupled into its crankshaft or into another corresponding shaft and can possibly lead to timing deviations in average torque and/or speed. Rotational irregularities of this kind can manifest themselves as vibration components of a rotational movement.

Vibration dampers are used to keep such rotational irregularities or vibration components of a rotational movement away from other components of a complex mechanical system like a drivetrain of a motor vehicle. These vibration dampers are intended to eliminate the vibration components or at least reduce the amplitude thereof. Accordingly, torsion dampers, for example, are used in a drivetrain of a motor vehicle within the framework of a start-up element. A start-up element is typically integrated between the internal combustion engine and a downstream transmission in order to allow continued running of the internal combustion engine even when the vehicle is stopped, during which the transmission input shaft is likewise stationary.

Energy accumulator elements are often employed in vibration dampers. These energy accumulator elements allow temporary absorption and, therefore, buffering of energy peaks of the rotational movement, which are then coupled into the rotational movement again at a later time. In many torsional vibration dampers, the energy accumulators which are often configured as spring elements, are connected in the actual torque path, i.e., the path of rotational movement, such that the rotational movement proceeds via the energy accumulator elements.

In contrast, in tuned mass vibration dampers no transmission of rotational movement takes place via the energy accumulator elements. The energy accumulator elements in these tuned mass vibration dampers typically comprise one or more damper masses, which can carry out oscillations in a force field to damp an unwanted vibration component of the rotational movement. The force field is formed by the forces acting on the damper masses. In particular, these forces also include a centrifugal force in addition to the weight force.

Sharply diverging requirements are sometimes imposed on corresponding tuned mass vibration dampers and the components making up the latter. Foremost in this respect, apart from functioning as efficiently as possible, are, for example, available installation space, a production in the simplest possible manner and lowest possible noise nuisance, to name only a few aspects. The components surrounding the tuned mass vibration damper typically allow only a limited installation space to be taken up by the tuned mass vibration damper in all operating states. It should also be producible in the simplest possible manner. Noise can also occur in tuned mass vibration dampers because of operation, for example, due to changes in the forces acting on the damper masses. As a result of the latter, it can happen that the damper masses of the tuned mass vibration damper are no longer guided with respect to the movement thereof substantially by centrifugal forces, but rather by the weight force acting upon them, for example, when a speed of the rotational movement and, therefore, the influence of the centrifugal forces decreases. Noises can occur when the damper masses collide with each other or with other components, for example, with the ends of their guide paths.

These noises, which are frequently metallic, can be perceived by the driver and the passengers of the motor vehicle as well as outside of the motor vehicle. These noises are frequently perceived by persons as annoying because the occurrence of these metallic noises is unexpected. For this reason, developers have tried to reduce noise generation in a tuned mass vibration damper.

DE 10 2011 087 631 A1 is directed to a low-noise torsional vibration damper comprising a centrifugal pendulum absorber with a pendulum mass carrier which is rotatable in an axial direction around an axis of rotation and two axially opposed pendulum masses which are connected to one another via a spacer. DE 10 2011 087 693 A1 is directed to a centrifugal pendulum absorber device for a damper device for a drivetrain of a motor vehicle. Provided therein at a pendulum mass carrier which is rotatable around an axis of rotation, are a plurality of pendulum masses, or pairs of pendulum masses movable in circumferential direction relative to the pendulum mass carrier. Two pendulum masses or pendulum mass pairs adjacent to one another in circumferential direction are mechanically coupled to one another via a damper element.

Apart from the most efficient possible functioning of a tuned mass vibration damper, the interest on the part of the manufacturer and developer consists in producing this tuned mass vibration damper, i.e., producing the individual components and assembling the latter to form the tuned mass vibration damper, in the simplest possible manner while simultaneously reducing noises that could be perceived as annoying by the driver and passengers of the vehicle or persons outside of the vehicle. In this regard, limitations and restrictions with respect to available installation space must often be taken into account at the same time. Therefore, there is a need to find a better compromise between a functioning of a tuned mass vibration damper, an efficient utilization of the available installation space, reduced noise during operation and the simplest possible production of this tuned mass vibration damper.

SUMMARY OF THE INVENTION

A tuned mass vibration damper according to one embodiment example, which can be intended for a drivetrain of a motor vehicle, serves to damp a vibration component of a rotational movement around an axis of rotation has a damper mass configured to execute an oscillation depending on the rotational movement to damp the vibration component thereof. A tuned mass vibration damper of this type further comprises at least one guide component part configured to movably guide the at least one damper mass in order to enable the oscillation thereof, wherein the damper mass comprises a retaining component part that is at least partially arranged in a receiving recess of the damper mass. The retaining component part has at least one retaining structure and the at least one guide component part has at least one mating retaining structure configured and arranged to limit a movement of the at least one damper mass relative to the guide component part in that the retaining structure comes in contact with the mating retaining structure. The at least one damper mass is further configured to drive the retaining component part during a movement of the damper mass along a circumferential direction and to allow a relative movement of the retaining component part with respect to the damper mass which results in a change in a radial distance of the retaining structure from the axis of rotation. The at least one damper mass and the at least one guide component part are further configured to prevent the retaining structure and mating retaining structure from coming in contact with one another when an upper threshold speed is exceeded.

This can take place, for example, by a first relative movement of the retaining component part with respect to the at least one damper mass that comprises the retaining component part. This movement can include, for example, a component which is greater along the radial direction than a component of the movement along the circumferential direction. As has already been mentioned, the circumferential direction is perpendicular to the axis of rotation and the radial direction. Accordingly, the radial direction is also perpendicular to the axis of rotation and the circumferential direction.

The movement of the at least one damper mass relative to the at least one guide component part can consist, for example, in a limiting of a movement component of the damper mass directed substantially along the circumferential direction. In this instance, the circumferential direction is perpendicular to the axis of rotation around which the rotational movement is carried out. A radial direction is perpendicular to both the circumferential direction and the direction of the axis of rotation at every point. Consequently, the radial direction, the axis of rotation and the circumferential direction form a coordinate system which is orthogonal at every point, but which can differ from point to point with respect to its orientation in individual directions. When the word "direction" is used in some of the phrases herein, this does not always necessarily refer to a direction in the mathematical sense of a vector. On the contrary, it may also merely indicate an orientation of a straight line or correspondingly straight portion extending in a corresponding manner along the "direction", unless a corresponding direction of a movement is meant.

A change in the radial distance of the retaining structure can be brought about, for example, by centrifugal force acting on the tuned mass vibration damper or components thereof, i.e. the at least one damper mass, the at least one guide component part and the retaining component part or retaining component parts.

A tuned mass vibration damper according to one embodiment can be used for a drivetrain of a motor vehicle and can serve to damp a vibration component of a rotational movement around an axis of rotation comprises at least one damper mass which is configured to carry out an oscillation depending on the rotational movement in order to damp the vibration component thereof. The tuned mass vibration damper further comprises at least one guide component part configured to movably guide the at least one damper mass to enable the oscillation of the damper mass. The damper mass comprises a retaining structure and the at least one guide component part, at least one mating retaining structure, which is configured and arranged to limit a movement of the at least one damper mass with respect to the guide component part as a result of the retaining structure and mating retaining structure coming into contact. The at least one damper mass and the at least one guide component part are configured to prevent the retaining structure and mating retaining structure from coming in contact when an upper threshold speed is exceeded. The mating retaining structure of the at least one guide component part is arranged at a radially outer outer contour of the at least one guide component part.

A tuned mass vibration damper according to one embodiment, which is intended for a drivetrain of a motor vehicle and can be used to damp a vibration component of a rotational movement around an axis of rotation comprises at least one damper mass configured to carry out an oscillation depending on the rotational movement in order to damp the vibration component of the oscillation and at least one guide component part configured to movably guide the at least one damper mass in order to enable the oscillation of the damper mass. The at least one damper mass or the at least one guide component part has a retaining projection, and the at least one guide component part or the at least one damper mass has a retaining recess with an at least partially curved outer contour which engage one inside the other at least occasionally or constantly. The at least one damper mass and the at least one guide component part are configured to change a radial distance between the retaining structure and the axis of rotation depending on a speed. The retaining projection and retaining recess are configured to limit a movement of the at least one damper mass with respect to the guide component part when a speed falls below a lower threshold speed.

Accordingly, embodiments of a tuned mass vibration damper are based on the insight that the above-mentioned compromise between functionality, efficient utilization of installation space, reduced noise during the operation of the tuned mass vibration damper and the simplest possible production of a tuned mass vibration damper can be improved in that a movement of the at least one damper mass with respect to the guide component part is limited through at least occasional engagement of a retaining structure and a mating retaining structure in the form of a retaining projection and a retaining recess. Accordingly, through the arrangement of the retaining structure at the damper mass and the arrangement of the mating retaining structure at the at least one guide component part, i.e., in that no interaction at all is implemented between a possible plurality of implemented damper masses, a functionality of the tuned mass vibration damper can possibly be improved because the damper masses can execute their oscillations independently from one another for damping the vibration component of the rotational movement. The tuned mass vibration dampers are configured precisely so that the movement of the at least one damper mass with respect to the at least one guide component part progresses more freely when an upper threshold speed is exceeded than when a speed falls below an upper threshold speed or a lower threshold speed which differs from it and which is typically lower than the upper threshold speed. As a result of this speed-dependent interaction of the retaining structure and corresponding mating retaining structure, the limiting of the movement of the at least one damper mass with respect to the at least one guide component part can optionally be restricted to operating situations in which there is an increased risk of noise development. Accordingly, on the one hand, adjustment of the oscillation of the tuned mass vibration damper can be restricted to those operating situations in which increased noise generation is expected. This makes it possible optionally to restrict adjustment which may impair the functionality of the tuned mass vibration damper to those operating conditions in which the risk that noise will occur is greater than in other operating conditions. In other words, the influence of the retaining structure and mating retaining structure on the functionality of the tuned mass vibration damper can be restricted to situations in which there is an increased risk that noises will occur. This makes it possible optionally to further improve the above-mentioned compromise, not least of all with respect to the reduction of noise, and functionality. Beyond this, because of the possibility of producing appropriate structures in a compact and simple manner, it is possible also to achieve a better compromise with respect to the installation space and production.

By implementing a retaining component part having the retaining structure in connection with the damper mass, the tuned mass vibration damper can optionally be adapted more selectively or the engagement of the retaining structure in the mating retaining structure can be effected more selectively in that, for example, the centers of gravity of the retaining component part and of the rest of the damper mass are configured differently. Additionally or alternatively, by implementing the mating retaining structure at an outer contour of at least one guide component part, production can be facilitated and a space-saving implementation is made possible. This applies equally to the implementation of the retaining structure and mating retaining structure, respectively, as retaining projection and retaining recess which has an at least partially curved outer contour.

The embodiment forms and modifications described in the following could be used independently of one another in the implemented configurations of a tuned mass vibration damper described above unless otherwise indicated explicitly in the description or implicitly from the technical context. For example, in a tuned mass vibration damper according to one embodiment, the at least one damper mass and the at least one guide component part can optionally be configured to allow the retaining structure and mating retaining structure to make contact when a speed falls below the upper threshold speed or a lower threshold speed differing from the upper threshold speed. This makes it possible to better adapt the tuned mass vibration damper to situations in which there is a corresponding risk of noise development. For example, this can take place through a second relative movement of the guide component part with respect to the at least one damper mass having the relevant retaining component part.

Optionally, a tuned mass vibration damper according to one embodiment example can include at least two damper masses arranged in an offset manner along the circumferential direction. In this case, the retaining structure and mating retaining structure can be configured and arranged precisely in such a way that a contact between two damper masses of the at least two damper masses which are adjacent along the circumferential direction is prevented by the retaining structure and mating retaining structure contacting one another when a speed falls below the upper threshold speed or lower threshold speed. By utilizing a corresponding retaining structure and a corresponding mating retaining structure, the above-described development of noise which is caused, for example, by the collision of two adjacent damper masses, which can be a source of noise, can optionally be prevented.

Additionally or alternatively, in a tuned mass vibration damper according to one embodiment example the retaining structure can comprise a retaining projection, for example, a pin or a tab, and the mating retaining structure can comprise a retaining recess. Alternatively, in a tuned mass vibration damper according to an embodiment example the retaining structure can have a retaining recess and the mating retaining structure can have a retaining projection, i.e., for example, a pin or a tab. A pin can be formed, for example, by a rivet, by a deep-drawing of a sheet-like workpiece, or some other protruding material projecting beyond a surface in the vicinity of the relevant retaining structure or mating retaining structure. For example, the retaining projection can have, either partially or in its entirety, a cylindrical outer contour with a circular, elliptical, polygonal or otherwise shaped cross section. Accordingly, a corresponding retaining projection or pin can be formed, for example, by a rivet to name only one example. In this way, it is possible to provide a corresponding tuned mass vibration damper by simple technical means, which makes it possible optionally to simplify production and accordingly to improve the above-mentioned compromise.

Optionally, in a tuned mass vibration damper according to one embodiment the retaining recess can have a first stop region along a circumferential direction along a predetermined rotational direction and a second stop region opposite the first stop region along the circumferential direction, and the stop region and second stop region are configured asymmetrically. This makes it possible optionally to implement different characteristics for making contact depending on external operating parameters, e.g., speed, and different characteristics for canceling contact. For example, it can be made easier for the retaining structure and mating retaining structure to engage or make contact. Optionally, it can also be made more difficult to cancel the relevant connection. However, it can also be possible, for example, to make the contact between the retaining structure and mating retaining structure easier to cancel, e.g., during an acceleration of the rotational movement.

Optionally, the first stop region can be arranged, for example, at a first end region of the retaining recess arranged along the circumferential direction. Additionally or alternatively, the second stop region can be arranged along the circumferential direction at a second end region of the retaining recess arranged opposite the first stop region. The stop regions can accordingly define the retaining recess, for example, along the circumferential direction.

A tuned mass vibration damper of this kind according to the invention can optionally be configured to damp a rotational movement with a predetermined rotational direction around the axis of rotation, the first stop region being arranged in such a way with respect to the second stop region and the predetermined rotational direction that the retaining projection can come in contact with the first stop region during an acceleration of the rotational movement due to an inertia of the at least one damper mass relative to the at least one guide component part. Correspondingly, during a retardation of the rotational movement due to the inertia of the at least one damper mass, the retaining projection can come in contact with the second stop region, and a contour of the first stop region has a greater angle than a contour of the second stop region with respect to a radial direction. In this way, with simply designed means it is possible optionally to implement different characteristics for the retaining structure and mating retaining structure to come in and out of contact for the acceleration and retardation of the rotational movement. In this way, for example, the rotational movement can be coupled into at least one guide component part. In other words, the at least one guide component part or at least one guide component part can be connected to a component part, i.e., for example, a shaft, transmitting the rotational movement substantially so as to be fixed with respect to rotation relative to it. Alternatively or also additionally, the guide component part or guide component parts can also form an input side of the tuned mass vibration damper via which the rotational movement and, therefore, also possibly the rotational energy above a temporal mean value is coupled into the tuned mass vibration damper. Accordingly, at the same time, the guide component part or guide component parts can also form the output side of the tuned mass vibration damper via which—under suitable limiting conditions—the movement energy stored in the vibration is also output back into the component part connected to the guide component part or guide component parts. The guide component part or guide component parts can accordingly also form the output side of the tuned mass vibration damper.

Optionally in this embodiment example of a tuned mass vibration damper, the contour of the second stop region can have an undercut with respect to the radial direction. This makes it possible optionally to configure the different characteristics mentioned above in such a way that the retaining structure and mating retaining structure remain in contact over a large angular area when the tuned mass vibration damper is stationary or during a slow rotation below the upper threshold speed or lower threshold speed. This makes it possible optionally to further reduce noise using simply designed elements and accordingly to further improve the above-mentioned compromise.

Additionally or alternatively in a tuned mass vibration damper according to an embodiment example, the retaining structure can optionally have the retaining projection and the mating retaining structure can have the retaining recess, the retaining recess being arranged at a radially outer outer contour of the at least one guide component part. In this way—as was already mentioned—a more compact and space-saving implementation can optionally be realized using simply designed elements in order to further improve the compromise mentioned above.

Additionally or alternatively, in a tuned mass vibration damper according to one embodiment, the at least one damper mass can be guided relative to the at least one guide component part in each instance by at least one rolling body which is guided respectively on a running path of the at least one guide component part and of the at least one damper mass. The retaining structure and the mating retaining structure or the retaining structure and at least one guide component part can be configured and arranged to prevent the rolling body from striking an end of the running path of the relevant rolling body. This makes it possible optionally to prevent the development of noise resulting from the rolling bodies striking or colliding with the corresponding ends of their running paths through the use of the retaining structure and mating retaining structure. The rolling bodies ideally roll on the running paths of the at least one guide component part and of the at least one damper mass.

In a tuned mass vibration damper of this kind according to one embodiment, the retaining structure can comprise a retaining projection. In this case, the damper mass and the guide component part can be configured and arranged in such a way that the retaining structure comes in contact with the at least one guide component part and/or the mating retaining structure at a speed above the upper threshold speed before the at least one rolling body hits an end of the running path of the relevant rolling body to prevent the rolling body from hitting the end of the relevant running path. For example, at least one guide component part can be configured such that the retaining structure comes in contact with an outer contour of the at least one guide component part at a speed above the upper threshold speed before the relevant rolling body strikes an outer contour of the at least one guide component part. This makes it possible optionally to achieve a noise reduction or even to completely prevent noise which can occur as a result of the rolling bodies striking the ends of their running paths without implementing additional structures.

The retaining structure and/or mating retaining structure can comprise at a surface thereof a material which results in reduced noise compared to metal-on-metal contact. Accordingly, for example, the retaining structure and/or the mating retaining structure can have a coating and/or a sleeve which is made, for example, from a polymer, such as, an elastomer, a thermoplastic or a thermosetting plastic. This polymer can have a mechanical elasticity such that when the retaining structure and mating retaining structure encounter one another or come in contact with one another a smoother retardation results compared to when entirely metal component parts come into contact.

Additionally or alternatively, in a tuned mass vibration damper according to one embodiment the at least one damper mass and the at least one guide component part can be configured to change a radial distance between the retaining structure and the axis of rotation depending on a speed. This can be realized, for example, through the use of the retaining component part, already described above, which comprises a retaining structure or in that the damper mass can undergo a radial displacement, for example, under the influence of centrifugal force. This can be realized, for example, through a corresponding configuration of the running path of the damper mass and/or of the at least one guide component part.

Additionally or alternatively, in a tuned mass vibration damper according to one embodiment the at least one damper mass can have the retaining recess as mating retaining structure shape. In this case, the at least one guide component part can have the retaining projection as a mating retaining structure shape. The retaining projection can be connected to the guide component part to be fixed with respect to rotation relative to it. This makes it possible optionally to simplify production of the tuned mass vibration damper because fewer complicated retaining recesses need be implemented as retaining structures. Additionally or alternatively, the use of corresponding retaining recesses can make it possible to reduce a mass of the damper masses and, accordingly, to reduce an area pressure acting, for example, on the guides of the at least one guide component part, i.e., for example, on the rolling bodies and the corresponding running paths. This makes it possible optionally to have individual component parts with smaller dimensions and/or to simplify the production of the individual component parts. This step can also lead to an improvement in the above-mentioned compromise.

In a tuned mass vibration damper according to one embodiment, the retaining recess can have a substantially constant width along its length. Additionally or alternatively, the retaining recess can be substantially circular segment-shaped or elliptical segment-shaped. The width may be, in a mathematical sense, a shortest distance of a straight line between two points at a contour of the retaining recess, where the connecting straight line intersects a possible location of a center point of the retaining projection. Accordingly, the production of a tuned mass vibration damper can be further simplified by these two steps. The above-mentioned compromise can be further improved in this way.

Additionally or alternatively, in a tuned mass vibration damper according to an embodiment example at least one guide component part can comprise a sheet-like material or can be produced therefrom. The retaining projection can be formed in part or in its entirety by a tab of the sheet-like material. This makes it possible optionally to further simplify a production of a tuned mass vibration damper according to an embodiment example and, accordingly, to improve the above-mentioned compromise.

A sheet-like material is one in which a material thickness along a first direction is less than an extension of the workpiece or of the starting material along a second direction and third direction which, e.g., independently from one another, can be perpendicular to the first direction and perpendicular to one another. Typically, an extension along the first direction is smaller by at least a factor of 2, by at least a factor of 5, or at least by a factor of 10, than an extension along the second direction and third direction. As used herein, however, the expression "sheet-like material" does not necessarily mean a metallic material, but rather refers exclusively to the geometry of the workpiece or starting material. As regards the question of the selected material, the at least one damper mass, the at least one guide component part and possibly other components, e.g., the rolling bodies, can be produced independently of one another from a metallic material, a plastic material, a combination thereof, or a metallic material and/or a plastic material. A metallic material is a material comprising a metal or metal alloy. The metal alloy can comprise metallic and/or nonmetallic elements, i.e., for example, other metals, but also carbon and other alloy elements. Additionally or alternatively, a metallic material of the type mentioned above can also comprise further components, for example, fibrous materials (e.g., glass fibers or carbon fibers). Plastic materials can be, for example, a polymer material, for example, an elastomer, a thermosetting plastic and/or a thermoplastic. The latter may optionally be reinforced by further components, for example, fibrous materials (e.g., glass fibers, carbon fibers) or can be influenced with respect to their mechanical properties in some other manner.

Two objects are adjacent to one another when there is no object of the same type arranged between them. Corresponding objects are directly adjacent when they adjoin one another, i.e., for example, contact one another. A component formed in one piece means a component that is made of exactly one contiguous piece of material. A component or structure made, provided or produced in one part or a component or structure made, provided or produced integral with at least one further component means that the component or structure cannot be separated from the at least one further component without destroying or damaging one of the at least two components concerned. Accordingly, a one-piece structural component part is also at least a structural component part which is formed integral with, or forms one part with, another structure of the relevant structural component part. A mechanical coupling of two components includes both a direct coupling and an indirect coupling.

A component part is seamless when it has no seam along a closed path around a predetermined direction, for example, an axial direction or an axis of symmetry, at which seam the component part is connected in itself or to another component part by a corresponding joining technique, for example, a bonding joining technique, in the present instance particularly by welding, soldering or gluing.

A component can have an n-fold rotational symmetry, for example, where n is a natural number greater than or equal to 2. An n-fold rotational symmetry exists when the relevant component can be rotated by (360°/n) around an axis of rotation or axis of symmetry and substantially transitions into itself with respect to shape, i.e., substantially self-maps in a mathematical sense after a certain rotation. In contrast, a completely rotationally symmetrical component substantially transitions into itself with respect to shape when rotated by any amount and by any angle around the axis of rotation or axis of symmetry, i.e., substantially self-maps in a mathematical sense. An n-fold rotational symmetry and a complete rotational symmetry are both referred to herein as rotational symmetry.

A frictional engagement connection is brought about through static friction, a bonding connection is brought about through molecular or atomic interactions and forces, and a positive engagement connection is brought about through a geometric connection of the relevant parts to be connected. Therefore, static friction generally presupposes a normal force component between the two parts to be connected. A frictional engagement contact or frictional engagement connection exists when two objects enter into frictionally engaging contact with one another such that a force is formed therebetween in case of a relative movement perpendicular to a contact surface between them, allowing a transmission of force, of a rotational movement or of a torque. In this regard, there can be a difference in rotational speed, i.e., slip, for example. But apart from this type of frictionally engaging contact, a frictional engagement contact also includes a frictional or non-positive engagement connection between the relevant objects in which a corresponding difference in rotational speed, or slip, essentially does not occur.

As has already been mentioned, the above-mentioned features can be implemented individually as well as in any combination with each other unless explicitly noted or unless impossible by reason of other technically implicit limitations.

BRIEF DESCRIPTION OF THE DRAWINGS

Embodiment examples will be described and explained more fully in the following with reference to the accompanying drawings.

FIG. 2a is a fragmentary elevational view as top view of a tuned mass vibration damper;

FIG. 2b is a partial top view along a section plane of a tuned mass vibration damper;

FIG. 2c is a cross sectional view along the section plane shown in FIG. 2b through the tuned mass vibration damper shown in FIG. 2b;

FIG. 3a is a side view of a retaining component part of a tuned mass vibration damper;

FIG. 3b is a front view of a retaining component part of a tuned mass vibration damper according to an embodiment example;

FIG. 3c is a top view of a retaining component part of a tuned mass vibration damper;

FIG. 5a is a top view of the tuned mass vibration damper shown in FIGS. 2a to 4 with deflection of the damper masses in a first direction;

FIG. 5b is a top view of the tuned mass vibration damper shown in FIGS. 2a to 4 with deflection of the damper masses in a second direction;

FIG. 6a is a top view of the tuned mass vibration damper shown in FIGS. 2a to 5b during a crawl operation of the engine or with after-running of the input transmission shaft at 0°;

FIG. 6b is a top view of the tuned mass vibration damper shown in FIGS. 2a to 5b during a crawl operation of the engine or with after-running of the input transmission shaft at 45°;

FIG. 6c is a top view of the tuned mass vibration damper shown in FIGS. 2a to 5b during a crawl operation of the engine or with after-running of the input transmission shaft at 90°;

FIG. 7a is a top view of a further tuned mass vibration damper with a position of an angled section plane;

FIG. 7b is a cross section through the tuned mass vibration damper shown in FIG. 7a along the angled section plane illustrated therein;

FIG. 7c is a perspective and isometric view of the tuned mass vibration damper shown in FIGS. 7a and 7b;

FIG. 8a is a side view of a retaining component part of a tuned mass vibration damper;

FIG. 8b is a front view of a retaining component part of a tuned mass vibration damper;

FIG. 8c is a top view of a retaining component part of a tuned mass vibration damper;

FIG. 9a is a top view of a tuned mass vibration damper;

FIG. 9b is an enlarged detail from FIG. 9a;

FIG. 10b is a cross-sectional view through the damper mass shown in FIG. 10a along the section plane of FIG. 10a;

FIG. 12a is a top view of a tuned mass vibration damper;

FIG. 12b is a cross-sectional view through the tuned mass vibration damper shown in FIG. 12a according to an angled section plane shown therein;

FIG. 12c is a perspective and isometric view of the tuned mass vibration damper shown in FIGS. 12a and 12b;

FIG. 16 is a perspective view of the guide component parts of the tuned mass vibration damper from FIGS. 14a to 15.

DETAILED DESCRIPTION OF THE PRESENTLY PREFERRED EMBODIMENTS

Figure 1B:
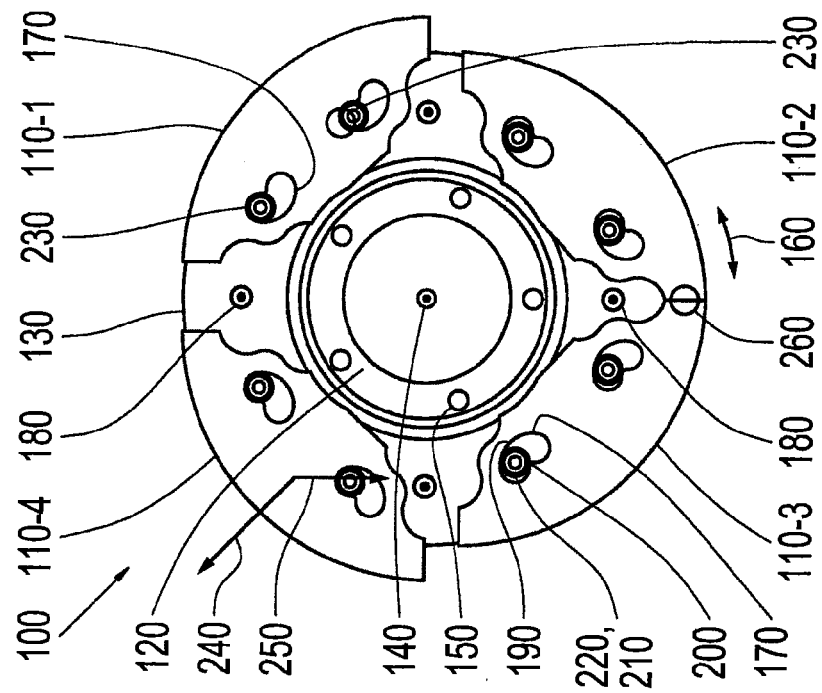
FIG. 1b is the tuned mass vibration damper shown in FIG. 1a in a second operating state.

Identical or comparable components are denoted by identical reference numerals in the following description of the accompanying drawings. Further, collective reference numerals are used for components and objects which occur more than once in an embodiment example or diagram but which are described collectively with respect to one or more features. Components or objects which are denoted by identical reference numerals or collective reference numerals may be constructed identically or possibly also differently with respect to one or more or all features, for example, their dimensions, unless otherwise explicit or implicit from the description.

As discussed above, tuned mass vibration dampers and other vibration dampers are used in many areas of machine, plant and automotive engineering in which there are unwanted vibration components when a rotational movement of a shaft is generated, transmitted or utilized. These vibration components can be reduced or even completely eliminated through the use of a corresponding vibration damper.

For example, corresponding rotational irregularities can occur in a drivetrain of a motor vehicle, i.e., for example, a passenger car, truck or utility vehicle, due, for example, to the operating principle of an internal combustion with a discontinuous power development owing to the combustion process taking place in this internal combustion engine. The rotational movement is transferred from the crankshaft via a start-up element, which allows continued running of the internal combustion engine even when the vehicle is stopped, to a transmission input shaft or other input shaft of a component downstream of the start-up element. The start-up element can be based, for example, on a hydrodynamic clutch, a frictionally engaging clutch or a combination of these two concepts.

Frictionally engaging contact exists when two objects enter into frictionally engaging contact with one another such that a force is formed therebetween in case of a relative movement perpendicular to a contact surface, which allows a force, a rotational movement or a torque to be transmitted. In this case, there can be a difference in rotational speed, i.e., slip. Apart from this type of frictionally engaging contact, a frictionally engaging contact also includes a frictionally engaging connection between the relevant objects in which a corresponding difference in rotational speed, or slip, essentially does not occur.

Corresponding start-up elements can be implemented, for example, as hydrodynamic converter with lockup clutch.

Vibration dampers, which also include tuned mass vibration dampers, have energy accumulator elements which are arranged and configured such that they can absorb energy peaks which occur during rotational irregularities and can couple them into the rotational movement again at another time. In this way, the unwanted vibration components are reduced or damped and possibly even completely eliminated.

In tuned mass vibration dampers, the energy accumulator elements are not positioned in the torque flow or transmission path of the rotational movement. Rather, they are merely coupled with the rotational movement by means of a flange or a flange region and can accordingly absorb the corresponding energy and release it again via the flange. This flange forms the input side and output side of the tuned mass vibration damper via which the energy can be coupled into and out of the tuned mass vibration damper.

The energy accumulator elements have damper masses that move in a force field which is at least partially formed by the gravity force and the centrifugal forces acting on the damper masses. Depending on the operating state of the tuned mass vibration damper, these two forces can be in a different proportion to one another in terms of magnitude, which is why the damper masses may possibly collide with one another or impact at their end points in unfavorable operating states. In conventional tuned mass vibration dampers, such events are frequently perceived by a driver and passengers of a corresponding motor vehicle, or even by passing pedestrians, as unpleasant because they occur unexpectedly and may be accompanied by consequently unpleasant noises. Since the relevant components are usually made of a metallic material, the corresponding noises are frequently metallic-sounding.

As will be shown in the following, it can be possible through the use of an embodiment example of a tuned mass vibration damper to prevent or at least reduce metallic noises which can occur, for example, in normal driving operation as well as in crawl operation of the vehicle and after the internal combustion engine, also referred to as engine, has been switched off. Events of the type described above can occur comparatively often precisely in vehicles which are outfitted with an automatic engine stop-start system.

Conventionally, plastic elements are sometimes used in the region of carrier plates. Owing to possible unfavorable tolerances, however, plastic elements of this kind can fall out and accordingly lead to impaired performance or even to a complete breakdown of the tuned mass vibration damper or start-up element. Beyond this, a coupling of the individual damper masses, also referred to as flyweights, to one another can also possibly be brought about in this way, which can contribute to a disadvantageous influence on the performance of the tuned mass vibration damper. Accordingly, in operation, the free movement of a damper mass can be hindered by this coupling to the adjacent damper mass. Depending on the specific configuration, a sufficient damping of impacts and, accordingly, a sufficient acoustical improvement may not be effected in a conventional solution of this type or one similar to it.

Figure 1A:
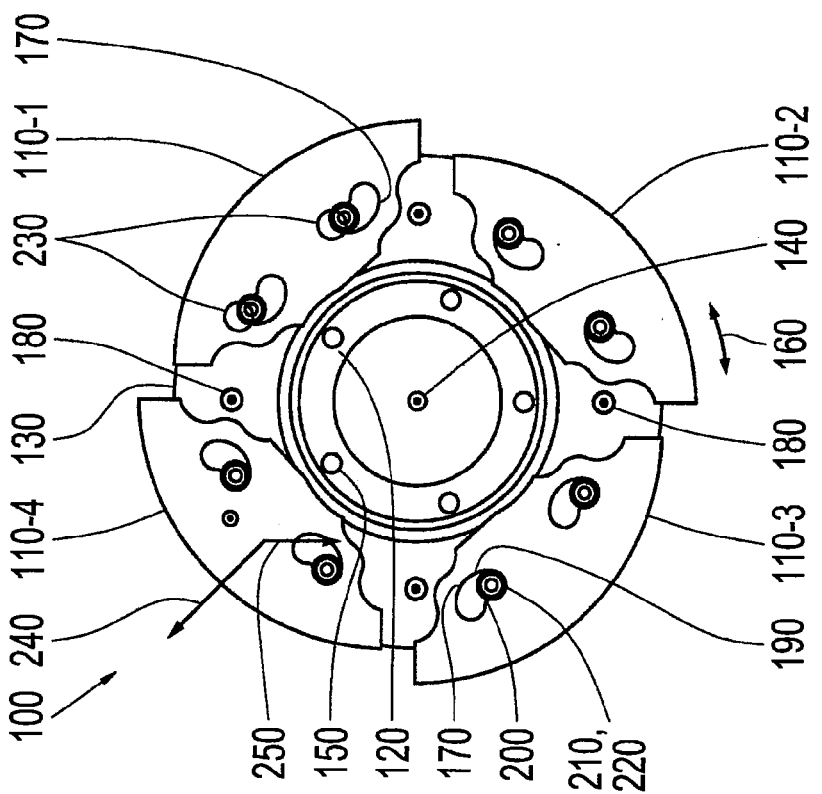
FIG. 1a is a top view of a conventional tuned mass vibration damper in a first operating state.

To illustrate the development of noise in a more detailed manner, FIGS. 1a and 1b show a top view of a conventional tuned mass vibration damper 100 having four damper masses 110-1, 110-2, 110-3 and 110-4 which are configured precisely so as to carry out an oscillation depending on a rotational movement that is coupled in via a flange region 120 in order to damp a vibration component of the rotational movement. To this end, the tuned mass vibration damper 100 in the form shown here has two guide component parts 130, only one of which is shown in FIGS. 1a and 1b for the sake of clarity. The flange region 120 is formed in the area of an axis of rotation 140 radially inside of one of the guide component parts 130 and correspondingly includes therein a plurality of flange bores 150 for mechanically fastening the tuned mass vibration damper 100 to another component.

The guide component parts 130 are configured to movably guide the damper masses 110 in precisely such a way that they are arranged so as to be offset along a circumferential direction 160 perpendicular to the axis of rotation 140 of the rotational movement and can execute the oscillation. To this end, the damper masses 110 and the guide component parts 130, which are also referred to as guide plates owing to their plate-like construction or as path plates because of their running paths 170, have guide paths 170, only one of which, by way of example, is designated by the relevant reference numeral in FIGS. 1a and 1b. Since the damper masses 110 cover particularly the guide paths in the guide component parts 130, they are also not visible in FIGS. 1a and 1b. FIG. 1a shows the behavior of the damper masses 110 during normal engine operation in which a rate of rotation of the engine—and accordingly the rate of rotation of the start-up element and of the tuned mass vibration damper 100—lies above the upper threshold speed, while FIG. 1b shows the behavior of the damper masses 110 in crawl operation of the engine or after the engine has been switched off, in which the rate of rotation of the engine—and accordingly the rate of rotation of the start-up element and of the tuned mass vibration damper 100—lies below the upper threshold speed or below a lower threshold speed. The lower threshold speed differs from the upper threshold speed and is typically also less than the upper threshold speed.

The guide paths 170 of the damper masses 110 and of the guide component parts 130 are fixed with respect to rotation relative to one another and so as to be spaced apart at fixed distances along the axis of rotation 140 by a spacer connection in the form of a plurality of spacer rivets 180 correspond to one another. Accordingly, the guide paths 170 of the damper masses 110 and of the guide component part 130 are constructed substantially identically, but are oriented in a mirror-inverted manner with respect to one another so that when the damper masses are deflected out of a center position a center of mass of the damper masses 110 is radially shifted. The guide paths 170 are substantially kidney-shaped, i.e., have a continuous curved portion 190 and an indented portion 200 opposite thereto.

In order to allow a guiding of the damper masses 110 through the guide component parts 130, the tuned mass vibration damper 100 further has for each damper mass 110 at least one, in the present case two, rolling bodies 210 which are constructed in this case as stepped rollers 220.

In normal operation, the noises mentioned above can occur, for example, when the damper masses 110, also referred to as flyweights, strike the ends 230 of the guide paths 170. This can happen, for example, when, as a result of occurring vibrations, the damper masses 110 tend to have a greater oscillation amplitude than is permitted by the maximum design oscillation angle, also referred to as torsional angle, as is shown by way of example in FIG. 1a. This results in a collision between the rolling bodies 210 and the ends 230 of the relevant guide paths 170.

In this operating state, a centrifugal force 240 is typically greater in magnitude than a weight force 250 acting on the damper masses 110.

However, as is shown in FIG. 1b, this situation can change when there is a decrease in speed of the rotational movement that is coupled into the tuned mass vibration damper 100. For example, after the engine is switched off, the rotational speed of the transmission input shaft to which the tuned mass vibration damper can be coupled so as to be fixed with respect to relative rotation or so as to be rigid with respect to rotation can drop to zero. In this case, however, as the speed of the transmission input shaft decreases, the centrifugal force 240 acting on the damper masses 110 also decreases in magnitude. Accordingly, the damper masses 110 are subject to little or no radial constraints and/or constraining forces. In this type of operating point or operating state, due to the weight forces 250 acting on the damper masses, these damper masses can possibly slide along their guide paths 170, also referred to as paths, or can even drop.

Depending on the specific setting or rotational position of the tuned mass vibration damper 100 and guide component parts 130 thereof, the damper masses 110 can strike their respective path ends 230 and/or collide with one another as is illustrated by way of example in FIG. 1b by collision point 260. This can cause a rattling noise which is audible both inside and outside of the vehicle and which is often found annoying.

Conventionally, this can be mitigated, for example, by inserting plastic elements between the damper masses 110. But these plastic elements can also fall out during unfavorable operating states or because of faulty assembly. It is also conceivable to mechanically couple the damper masses 110 to one another. However, during operation, a damper mass can impede the freedom of movement of the adjacent damper mass through this coupling. This can possibly lead to a reduced functionality or functional characteristic of the tuned mass vibration damper 100.

Figure 2D:
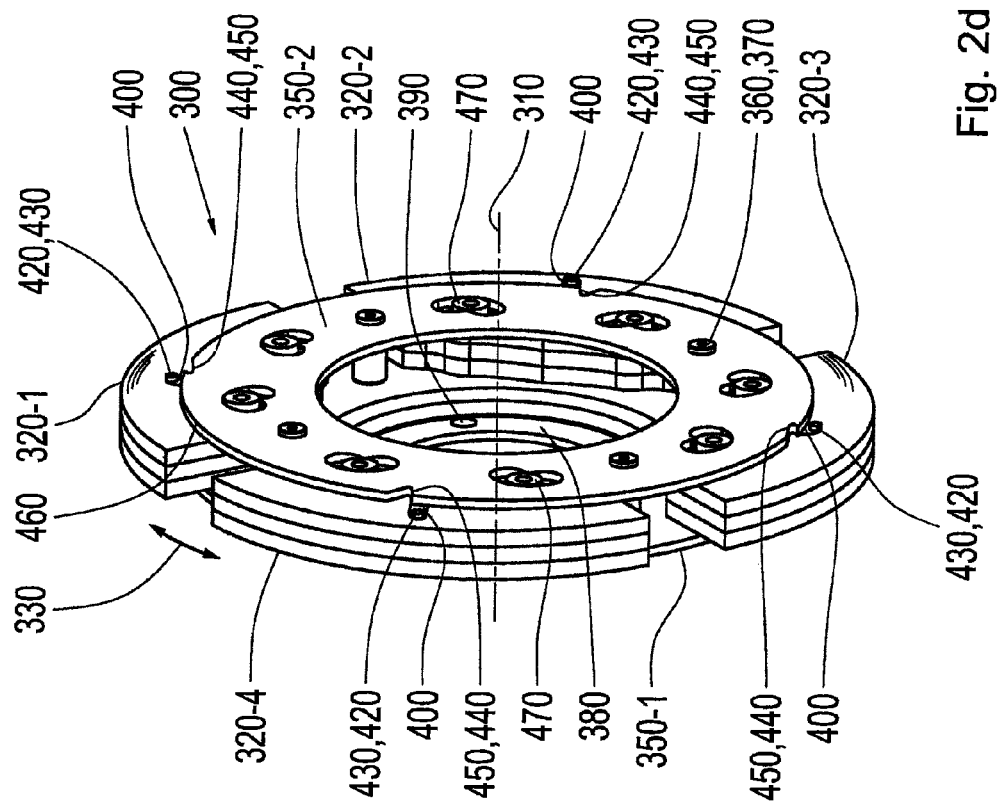
FIG. 2d is a perspective view of the tuned mass vibration damper from FIGS. 2a to 2c.

FIGS. 2a, 2b, 2c and 2d show a fragmentary elevational view as a top view of a tuned mass vibration damper 300 according to an embodiment example, a top view of the tuned mass vibration damper 300 with the course of a section plane, a section through the tuned mass vibration damper 300 along the section plane shown in FIG. 2b and a perspective and isometric view of the tuned mass vibration damper 300 according to one embodiment. Like the conventional tuned mass vibration damper 100 from FIGS. 1a and 1b, tuned mass vibration damper 300 which is also suitable for a drivetrain of a motor vehicle and serves to damp a vibration component of a rotational movement around an axis of rotation 310 also includes fours damper masses 320-1, 320-2, 320-3 and 320-4 configured to optionally carry out an oscillation depending on the rotational movement around the axis of rotation 310 in order to damp a vibration component of the rotational movement that may be included therein. As is shown in FIGS. 2c and 2d, the individual damper masses 320 which are arranged in an offset manner along a circumferential direction 330 are constructed in a plurality of parts from individual damper masses 340.

In the tuned mass vibration damper 300 shown in FIGS. 2a to 2d, the individual damper masses 320 are formed in each instance of three individual damper masses 340-1, 340-2 and 340-3 assembled so as to be adjacent along the rotational direction 310, i.e., along the axial direction of the tuned mass vibration damper 300, to form a damper mass 320 in each instance. For this reason, the damper masses 320 are also referred to as flyweight assemblies. The number of damper masses 320 and the construction thereof, i.e., for example, the question of the quantity of individual damper masses 340, can be implemented differently in different embodiment examples of a tuned mass vibration damper 300 according to an embodiment example. For example, a torsional vibration damper can also have fewer than four damper masses 320, i.e., for example, one damper mass 320, two damper masses 320 or three damper masses 320, but can also have more than four damper masses, for example, five damper masses 320, six damper masses 320 or more. The damper masses 320 can also be formed of one part, but can also comprise a plurality of parts as is shown in FIGS. 2a to 2d. Although the damper masses 320 are constructed as sets of disks in the embodiment example shown here, they can also optionally be constructed in some other way. The individual damper masses 340 can be guided along the axial direction by their connection to one another or also merely through their position.

The tuned mass vibration damper 300 further has at least one guide component part 350 is capable of movably guiding at least one damper mass 320 such that the latter can execute the oscillation. More precisely, in the embodiment example shown here, the tuned mass vibration damper 300 has two guide component parts 350-1, 350-2 spaced apart along the axial direction, i.e., along the axis of rotation 310, only one of which, 350-2, is shown in section in FIG. 2a for the sake of clarity. The two guide component parts 350-1, 350-2 are coupled to one another so as to be fixed with respect to rotation relative to one another with respect to the axis of rotation 310 by a plurality of spacer connections 360, e.g., in the form of spacer rivets 370. The section plane shown in FIG. 2b runs through the spacer rivet 370 as is shown in FIG. 2c. Four spacer connections 360 which connect the two guide component parts 350 to one another so as to be fixed with respect to relative rotation are used in the embodiment example shown here. In other embodiment examples the number of spacer connections 360 and the manner in which they are constructed can also differ, for example, from spacer rivets 370. For this reason, the spacer connection 360 is also referred to as spacer piece and, in case it is implemented as a spacer rivet, also simply as rivet.

For coupling in the rotational movement around the axis of rotation 310, one of the guide component parts 350, more precisely guide component part 350-1, has a flange region 380 which allows the guide component part 350-1 to be mechanically coupled via a plurality of bores 390 to a structural component part, i.e., for example, a corresponding shaft or other rotating structural component part, which transmits the rotational movement. Accordingly, the guide component part 350-1 is the input side of the tuned mass vibration damper 300. Since the rotational movement does not run via the damper masses 320 functioning as energy accumulators in a tuned mass vibration damper 300 such as has already been described, the energy stored in the damper masses 320 is also coupled out or returned via the first guide component part 350-1 which therefore also forms the output side of the tuned mass vibration damper 300. Accordingly, the guide component part 350-1 is the component part of the tuned mass vibration damper 300 which couples it to the source of the rotational movement.

Of course, the tuned mass vibration damper 300 can also be coupled only indirectly to a corresponding shaft or other corresponding rotating structural component part, e.g., a crankshaft of a drive motor. Accordingly, a tuned mass vibration damper 300, for example, in connection with a corresponding start-up element, can also be connected to another component, for example, a lockup clutch, another torsional vibration damper, or other component transmitting the rotational movement.

In the tuned mass vibration damper 300 shown in FIG. 2a, which is also referred to as a speed-adaptive damper, the damper masses 320 are shown in a neutral position. The damper masses 320 have a retaining component part 400-1, 400-2, 400-3, and 400-4 in each instance. The retaining component parts 400 are arranged in receiving recesses 410 of the damper masses 320 and are therefore also considered part of the latter. In other words, the damper masses 320 have their respective retaining component parts 400 and are therefore also referred to as retaining weights. The damper masses 320 are implemented in precisely such a way that they are capable of driving their respective retaining component parts 400 during a movement of the damper mass 320 along circumferential direction 330. At the same time, the damper masses 320 enable a relative movement of the retaining component parts 400 with respect to the damper mass 320 which leads to a change in a radial distance of a retaining structure 420 from the axis of rotation 310. The associated radial direction is perpendicular to the axis of rotation 310, or to the axial direction and circumferential direction 330 corresponding to the latter, at every point.

The receiving recesses 410 are oriented substantially along the radial direction in the embodiment example shown here. When the retaining component part 400 moves along a receiving recess 410 in this way, the above-mentioned change in the radial distance of the retaining structure 420 from the axis of rotation 310 results. Of course, in other embodiment examples the receiving recesses 410 can also be configured differently in the neutral position. They can be configured, for example, in such a way that they also lead simultaneously to a movement of the retaining component part 400 along the circumferential direction 330 when the retaining component part 400 moves along the receiving recess 410. This can be implemented, for example, in that the receiving recess 410 in turn moves diagonally, i.e., at an angle to the relevant radial direction in the neutral position shown in FIGS. 2a to 2d.

The retaining structures 420 of the retaining component parts 400 are configured as retaining projection 430 extending along the axis of rotation 310. As is shown in FIG. 2c, the retaining projections 430 extend at both sides of the retaining component part 400. The retaining structure 420 of the retaining component part 400 is configured and arranged precisely such that it can engage in or make contact with a mating retaining structure 440 of at least one of the guide component parts 350 such that a movement of the damper masses 320 with respect to the guide component part 350 or guide component parts 350 can be limited. In the embodiment example shown here, the mating retaining structures 440 are provided in the form of retaining recesses 450, which are provided at a radially outer outer contour 460 of at least one guide component part. The outer contour 460 bounds the shape of the relevant guide component parts 350 on the radially outer side. In the embodiment shown here, the first guide component part 350-1 and second guide component part 350-2 each have at their outer contours 460 corresponding mating retaining structures 440 in the form of the retaining recesses 450. Of course, this can be implemented differently in other embodiment examples. For example, if the tuned mass vibration damper 300 has only one individual guide component part 350, the corresponding mating retaining structure 440 can also be arranged, for example, only at the outer contour 460 of this guide component part 350. However, in case of a tuned mass vibration damper 300 with more than one guide component part 350, only one individual guide component part 350, but at least not all of the guide component parts 350, can also optionally have corresponding mating retaining structures 440.

As will be seen from the following description, the mating retaining structure 440 can also be provided at a location other than the radially outer outer contour 460 of the relevant guide component part 350 or guide component parts 350 in other embodiments. Also, a corresponding retaining projection 430 can be used as mating retaining structure 440 instead of a retaining recess 450 and a corresponding retaining recess 450 can be used as retaining structure 420. In other words, the roles of retaining projection 430 and retaining recess 450 can, of course, be switched.

Before the configuration of the retaining recess 450 is described in more detail in connection with FIG. 3, the guiding of the damper masses 320 through the guide component part 350 should first be described more fully. In the embodiment shown here, the damper masses 320, also referred to simply as flyweights, are guided relative to the guide component parts 350 by two rolling bodies 470 in each instance, each rolling body 470 rolls on a running path 480 of the guide component parts 350 and a corresponding running path 490 of the damper masses 320 and accordingly allows the damper masses 320 to be guided along the radial direction. For this reason, they are also referred to as rollers or stepped rollers when they are constructed in a stepped manner for axial guidance as will be described in the following.

If the damper masses 320 are excited to vibrate along the circumferential direction 330, the centers of the gravity of the damper masses 320 are subjected to a radial movement component owing to the configuration of the running paths 480, 490 and the movement of the rolling bodies 470. In this way, because of the centrifugal forces and weight forces acting on them, the damper masses can build potential energy, which can serve to buffer the energy peaks introduced into the tuned mass vibration damper 300 through the vibrations. The rolling bodies 470 can be constructed as stepped rollers that can be guided axially through the guide component parts 350 because of their stepped configuration. Because of the implementation of the running paths 480 in the guide component parts 350, which are produced in the present instance from a sheet-like material, they are also referred to as path plates. In other words, the first guide component part 350-1 is also referred to as left-hand path plate and the second guide component part 350-2 is referred to as right-hand path plate because—considered along the torque flow in which the torque is represented as being transferred from left to right—the first guide component part 350-1 is arranged on the left-hand side due to its flange region 380 and the second guide component part 350-2 is arranged on the right hand side. Between the two guide component parts 350, the damper masses 320 are guided through the guide component parts 350 not only radially but also axially, i.e., along the axis of rotation 310, as is also shown by way of example in FIG. 2c.

FIGS. 2a to 2d show the assembly of the tuned mass vibration damper 300 with installed retaining component parts 400 in their neutral position. As can also be gathered from the illustrations, the retaining component parts 400 are installed in the receiving recesses 410, also referred to as cutouts, of the damper masses 320 and are guided in radial direction through the latter and driven in circumferential direction 330 by the damper masses 320. FIGS. 2b and 2c show the tuned mass vibration damper 300 with the installed retaining component parts 400 in a sectional view. As can also be seen from this illustration (FIG. 2c), the retaining component parts 400 are held in axial direction, i.e., along the axis of rotation 310, in a manner similar to the damper masses 320 by the guide component parts 350 of the tuned mass vibration damper 300 and are guided along or driven in circumferential direction 330 by the damper masses 320.

FIGS. 3a, 3b and 3c show a retaining component part of a tuned mass vibration damper 300 from FIGS. 2a to 2d as a side view, front view and top view. As is shown, for example, by FIG. 3b, the retaining component part 400 has an oval shape in which the retaining structure 420, i.e., the retaining projection 430, has a substantially circular cross-sectional shape. FIGS. 3a and 3c show that the retaining projections 430, also referred to as retaining protuberances, are provided for insertion into the retaining recesses 450 of the mating retaining structure 440 of the guide component parts 350, which retaining recesses 450 are also referred to as retaining grooves. As is shown particularly in FIGS. 3b and 3c, the retaining projections 430 are arranged substantially in the center with respect to the circumferential direction 330 in their installed condition in the tuned mass vibration damper 300.

Figure 4:
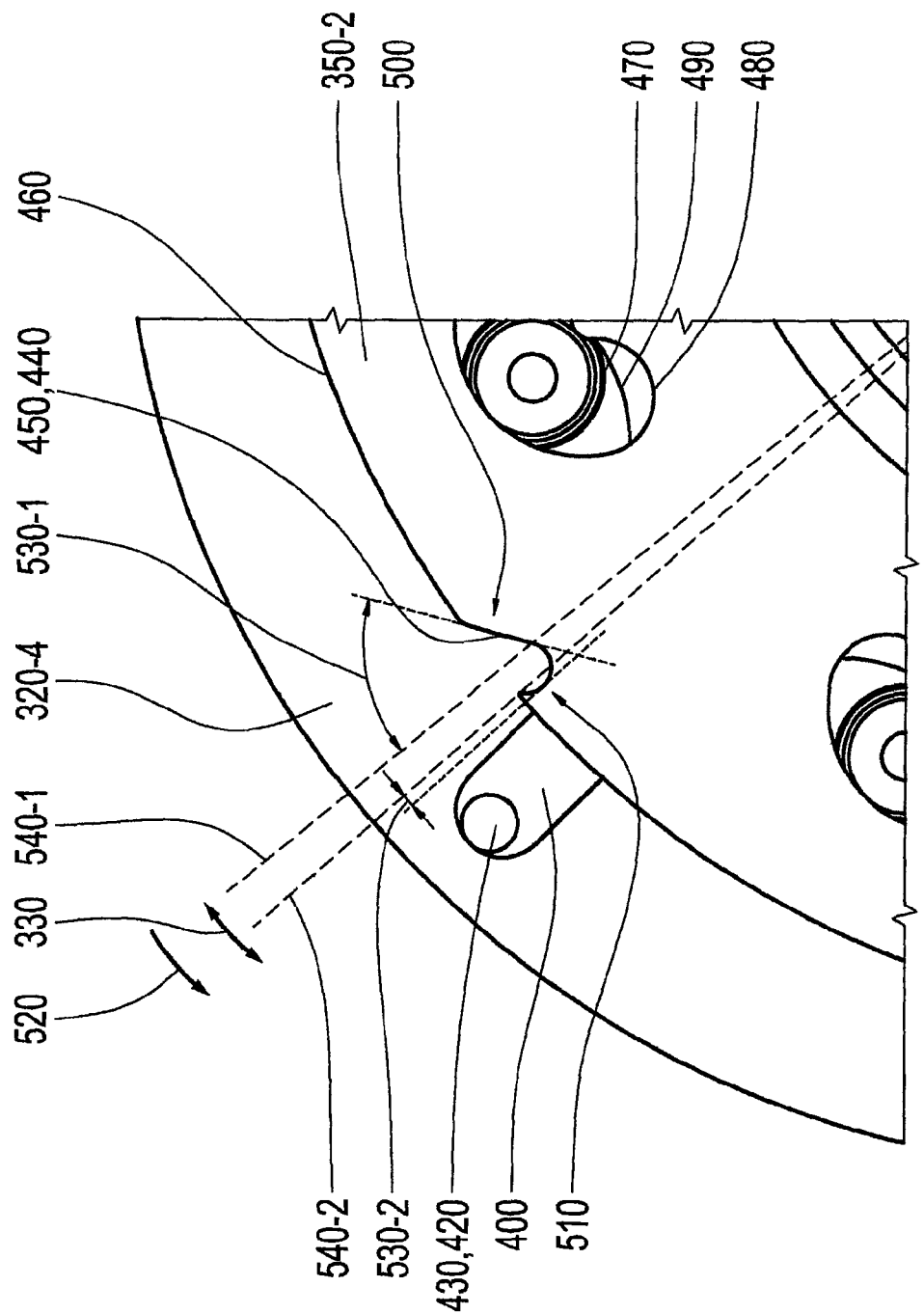
FIG. 4 is a portion of a mass vibration damper.

Before describing the functioning of the tuned mass vibration damper 300 in more detail in connection with FIGS. 5a, 5b, 6a, 6b and 6c, the configuration of the retaining recess 450, i.e., the mating retaining structure 440 in the embodiment example shown in FIGS. 2a to 2d, will be described more fully referring to FIG. 4. The retaining recess 450 is arranged at the outer contour 460 of the retaining component parts 350. FIG. 4 shows retaining component part 350-2 by way of example. The retaining recess 450 is arranged along circumferential direction 330 and has a first stop region 500 and a second stop region 510 which is arranged along circumferential direction 330 opposite the first stop region 500. The stop regions 500, 510 are configured asymmetrically so that, referring to a rotational direction 520 of the rotational movement, different characteristics can be realized with respect to an acceleration of the guide component parts 350 and retardation of the guide component parts 350 with respect to the retaining projection 430 entering into contact with or disengaging from contact with the retaining recess 450. As is also shown in FIG. 4, an angle 530-1 between a contour of the first stop region 500 and a radial direction 540-1 is larger than a corresponding angle 530-2 and a corresponding further radial direction 540-2 with respect to the second stop region 510. In other words, the first stop region 500 extends at a smaller inclination relative to circumferential direction 330 than the second stop region 510.

More exactly, the second stop region 510 in the embodiment shown here is even configured with an undercut. For this reason, FIG. 4 shows, as angle 530-2 by way of example, an angle in the region of the location along the circumferential direction 330 at the furthest distance from the first stop region 500. At this point, a corresponding tangent of the contour of the second stop region 510 extends substantially parallel to the radial direction 540-2 so that angle 530-2 is substantially 0°.

The stop regions 500, 510 are arranged in end regions of the retaining recess 450, but can also optionally be located at other portions or regions of the retaining recess 450 in other embodiment examples. Accordingly, the retaining projection 430 can slide into the retaining recess 450 and accordingly make contact with the latter via the retaining component parts 400 which are, of course, movable in the receiving recess 410 such that a change in the distance of the retaining projection 430 or retaining structure 420 from the axis of rotation 310 can occur owing to a centrifugal force acting on it. Depending on whether the guide component part 350 is accelerated or retarded, the retaining projection 430 can come in contact with the first stop region 500 or the second stop region 510 owing to the inertia of the damper masses 320. For example, if the retaining projection 430 is already received in the retaining recess 450 because of decreasing centrifugal forces, then, as the result of a further retardation of the guide component part 350, i.e., when there is a change in the angular velocity opposite the rotational direction 520, the retaining projection 430 can come in contact with the second stop region 510 and remain in contact longer than in a configuration of the second stop region 510 similar to the first stop region 500 owing to the undercut or smaller angle with respect to the radial direction 540-2. On the other hand, during an acceleration of the guide component part 350, the retaining projection 430 can optionally exit more easily from the retaining recess 450 by coming in contact with the first stop region 500.

As regards the functioning of the tuned mass vibration damper 300 described in FIGS. 2a to 4, the tuned mass vibration damper 300 is based on a radial movability of the retaining structure 420 with respect to the mating retaining structure 440. Using the retaining component parts 400, which are incorporated in the damper masses 320 and which are substantially freely movable in radial direction, it may be possible to prevent the damper masses 320 of the tuned mass vibration damper 300 (speed-adaptive damper or DAT) from dropping freely. In this way, a momentum which can possibly have a negative effect on the acoustic properties of the tuned mass vibration damper 300 can possibly be considerably reduced or even completely eliminated. In other words, it is possible optionally that a rattling noise will not be perceived either inside or outside of the vehicle in this case.

Compared to other, conventional solutions, the damper masses 320 arranged along circumferential direction 330 can carry out oscillations independently from one another in a tuned mass vibration damper 300 according to an embodiment. In other words, the damper masses 320 do not mutually impede one another with respect to function. Each damper mass 320 operates independently because no coupling is implemented between the damper masses 320. Irrespective of the this, however, one of the steps briefly mentioned above, i.e., for example, implementation of a plastic ring or other noise-reducing step, can also optionally be provided in connection with a tuned mass vibration damper 300 according to an embodiment example.

During operation of the engine, i.e., in an operating condition in which a speed of the rotational movement is greater than an upper threshold speed, the retaining structure 420 is prevented from making contact with the mating retaining structures 440 of the guide component parts 350 due to the damper masses 320 and, therefore, also the retaining component parts 400 comprised therein. The damper masses 320 are drawn out radially owing to the occurring centrifugal forces. This also applies to the retaining component parts 400 (retaining weights) located in the damper masses 320. These retaining component parts 400 are arranged at the outer contour of the receiving recesses, also referred to as cutouts, in the damper masses 320 and participate in the oscillating movement of the damper masses 320 without impeding the function of the damper masses 320.

FIGS. 5a and 5b show top views of the tuned mass vibration damper 300 from FIGS. 2a to 4. The tuned mass vibration damper 300 is shown in these figures with damper masses 320 deflected in both directions by the full oscillating angle. As can be seen from the figures, the retaining projections 430, also referred to as protuberances, or retaining structures 420 do not touch the guide component parts 350 in the stops of the running paths 480. A damping of the impacts of the damper masses 320 at the path ends thereof or at the ends of running paths 480, 490 can be provided by additional measures such as plastic rings or the like. Additionally or alternatively, however, a corresponding damping effect can also be achieved by a corresponding configuration of the damper masses 320 and the retaining component parts 400 thereof. To this end, the retaining projection 430 of the retaining structure 420 can be configured at the retaining component parts 400 such that they come in contact with the guide component parts 350 before the damper masses 320 can abut at their stops. As is also shown by way of example in FIG. 5a, the retaining structure 420 i.e., the retaining projection 430, can come in contact with the guide component part 350 or with the mating retaining structure 440 at a speed above the upper threshold speed before the rolling bodies 470 strike an end of the running paths 480, 490 so as to prevent an impact of the rolling body 470 in the end of the relevant running paths 480, 490. For this purpose, in the embodiment example described thus far the guide component parts 350 are configured in precisely such a way that the retaining structures 420 come in contact with the outer contours 460 of the guide component parts 350 at a speed above the upper threshold speed before the relevant rolling body 470 impacts on or strikes the ends of the running paths 480, 490.

For better damping, the retaining projections 430 can optionally be coated or provided with a suitable sleeve. The coatings and sleeves can be made, for example, of an elastic material, i.e., a rubber or other appropriate plastic.

While FIGS. 5a and 5b show the tuned mass vibration damper 300 with damper masses 320 in deflected condition, kinematics of the tuned mass vibration damper 300 with damper masses 320 are described in the following referring to FIGS. 6a, 6b and 6c. FIG. 6a shows a top view of the tuned mass vibration damper 300 in which the damper masses are arranged in a 0-degree position. The guide component parts 350 are correspondingly rotated by 45° in the view in FIG. 6b and by 90° in the view in FIG. 6c relative to the situation shown in FIG. 6a. FIGS. 6a to 6c relate to a crawl operation of the engine or an after running of the transmission input shaft in which a speed of the rotational movement is less than the upper threshold speed, possibly even less than a lower threshold speed, at which the retaining structures 420 can come in contact with the mating retaining structures 440 and can accordingly limit the movement of the damper masses 320.

Accordingly, during operation, owing to the high centrifugal forces acting on them, the damper masses 320 are typically pressed radially outward and move along their paths defined by the shape of the running paths 480, 490. In other words, the movement of the damper masses 320 is defined by the geometry of the running paths 480, 490 (paths) in the damper masses 320 as well as in the guide component parts 350. However, in crawl operation of the vehicle or after the engine has been switched off, the centrifugal force may possibly no longer be sufficient to hold the damper masses 320 in their specified position. Depending on the angular position of the tuned mass vibration damper 300, also referred to as damper for the sake of brevity, the damper masses 320 can either drop freely or slide down along the running paths 480, 490. The retaining component parts 400 can now optionally prevent the corresponding nominal movement of the flyweights in the running paths 480, 490 thereof in that the retaining structure and the mating retaining structure 440, i.e., the retaining projection 430 and the retaining recess 450, come in contact with one another. In other words, the retaining projections 430 of the damper masses 320 can be driven along into the retaining recesses 450 of the guide component parts due to the weight forces acting on them. The damper masses 320 can be prevented from dropping in this way, and rattling noises perceived as annoying can accordingly also be optionally prevented.

This condition is shown in a more detailed manner in FIGS. 6a to 6c and will now be described. During a slow rotation of the tuned mass vibration damper 300, i.e., of the guide component parts 350, along the rotational direction 520 correspondingly illustrated in sequence in FIGS. 6a, 6b and 6c, the damper masses 320 slide radially inward in the upper half of the tuned mass vibration damper. The retaining projections 430 accordingly contact the outer contour 460 of the guide component parts 350 and retain the latter during the rotation until they enter the retaining recesses 450 of the guide component parts 350. The damper masses 320 are accordingly prevented from continued movement in circumferential direction 330. Depending on the above-described shape of the undercut of the retaining recesses 450, the retaining component parts 400 first slide down from their support into the bottom half of the tuned mass vibration damper 300 and accordingly release the damper masses 320 again. Depending on the speed at which the tuned mass vibration damper 300 continues to rotate, collision of the damper masses 320 is either entirely prevented or is appreciably reduced.

When the tuned mass vibration damper 300 starts up again, it is expected that the damper masses 320 will lag behind due to their inertia. The retaining projections 430 of the retaining component parts 400 are pressed outward out of the undercuts owing to the geometry of the retaining recesses 450. Accordingly, in many operating situations the functionality of the tuned mass vibration damper 300 is not impaired during start-up, i.e., as the speed of the rotational movement increases.

Accordingly, through the use of a tuned mass vibration damper 300 of this type, two damper masses 320, which are adjacent along circumferential direction 330, can optionally be prevented from striking or touching one another even when more than two damper masses 320 are arranged in an offset manner along the circumferential direction 330.

As has already been shown by way of example in FIG. 2a, the running paths 480, 490 of the guide component parts 350 and of the damper masses 320 are configured differently. The running paths 480 of the damper masses 320 in the embodiment shown here are substantially kidney-shaped, while the running paths 490 of the damper masses 320 are substantially oval-shaped. In other embodiment examples, kidney-shaped running paths and oval-shaped running paths can also be used in principle for both running paths 480, 490, or the pairing referring to FIG. 2a can also be reversed. When the running paths 480, 490 are running paths in which the damper masses 320 can be radially movable also without implementation of the retaining component part 400, it can be possible optionally to further limit a radial movability of the retaining component part 400 or optionally also to provide the retaining structure 420 directly at the damper mass 320. In this case, the functionality mentioned and described above can be implemented by arranging the mating retaining structure 440 at the outer contour 460 of the guide component parts 350, i.e., when the at least one damper mass 320 and the at least one guide component part 350 are capable of changing a radial distance between the retaining structure 420 of the damper mass 320 and the axis of rotation 310 depending on speed. It is noted here merely in passing that the retaining component part 400 in the embodiment shown in FIGS. 2a to 6c is also configured as part of the damper mass 320, i.e., the retaining component part 400 is included in the damper mass 320, so that the retaining structure 420 and, therefore, the retaining projection 430 are also part of the damper mass 320 in this case.

FIGS. 7a, 7b and 7c show a top view, a cross-sectional view and a perspective or isometric view of a further tuned mass vibration damper 300 according to an embodiment and FIG. 7a shows a position of the angled section plane from the view in FIG. 7b. In this variant of the tuned mass vibration damper 300, the retaining component parts 400 are constructed so as to be narrower along the circumferential direction 330 than in the variants described above. The retaining component parts are accordingly lighter, which can prove advantageous during a startup of the tuned mass vibration damper 300. Beyond this, the retaining recesses 450 of the mating retaining structures 440 of the guide component parts 350 have no undercut in the second stop region 510, which can again be advantageous for the behavior of the retaining component parts 400 during a startup of the tuned mass vibration damper. On the other hand, however, omission of the undercut can also result in that the retaining component parts 400 exit their support in the retaining recesses 450 sooner due to the absence of the undercut in the guide component parts 350, which could turn out to be less favorable with respect to acoustics. Accordingly, FIGS. 7a to 7c show a further variant of a tuned mass vibration damper with corresponding retaining component parts 400.

FIGS. 8a to 8c show an enlarged side view, a front view and a top view of the retaining component part 400 of variant 2 which substantially correspond to FIGS. 3a to 3c. Apart from the above-mentioned smaller dimensioning of the retaining component part 400 along circumferential direction 330, the retaining component part 400 in FIGS. 8a to 8c also differs from that shown in FIGS. 3a to 3c in that the retaining projection 430, i.e., the retaining structure 420, does not have a circular cross-sectional shape but rather a substantially rectangular shape apart from a flattened or rounded portion on the radially outer side.

FIG. 9a shows a top view of a further tuned mass vibration damper 300 according to an embodiment that differs from the embodiment examples described above in that now, instead of a retaining component part 400, a retaining structure 420 or retaining projection 430 is integrated directly in the damper masses 320 as a pin 560. Correspondingly, the mating retaining structure 440, i.e., the retaining recess 450, is now also no longer arranged at the outer contour 460 of the guide component parts 350 but rather is moved radially inward and is configured as an at least partially curved retaining recess 450 with a corresponding at least partially curved outer contour 550. More precisely, the embodiment has an at least partially curved radially outer outer contour 550-1 and a radially inner outer contour 550-2 which are curved radially outward similar to the running paths 480 of the guide component parts 350.

In this variant of the tuned mass vibration damper 300, the damper masses 320 are retained by a pin 560 that forms the retaining projection 430 of the retaining structure 420. This pin 560 is seated in the damper masses 320. The retaining projection 430 protrudes beyond the damper masses 320 on both sides along the axis of rotation 310, i.e., along the axial direction, so as to be guided by both guide component parts 350-1, 350-2. Additional windows, namely, retaining recesses 450 with the outer contours 550-1, 550-2 mentioned briefly above, in which the retaining projection 430 can run without contacting during operation are provided in the guide component parts 350 so that the movement of the damper masses 320 is not impeded during normal operation. These retaining recesses 450, i.e., the corresponding windows, are provided with one or more retaining grooves in which the damper masses 320 can engage as the centrifugal force decreases. Accordingly, the rattling noise of the damper masses 320 is reduced or possibly even completely prevented in this tuned mass vibration damper 300.

FIG. 9b shows an enlarged view of the region, denoted by an X in FIG. 9a, of the second guide component part 350-2 and of the damper mass 320 and the window with the retaining grooves for the retaining projection 430 of the retaining structure 420, which retaining projection 430 is constructed as pin 560. The retaining grooves in which the retaining projection 430 can possibly engage are formed in this case on the radially inner side and, like the retaining recesses 450 in the embodiment examples described above, are also configured asymmetrically.

The retaining grooves are configured as part of the radially inner outer contour 550-2 of the retaining recess 450. The radially outer outer contour 550-1 of the retaining recess 450 is substantially circular segment-shaped or ellipsoid-shaped in this case.

Figure 10B:
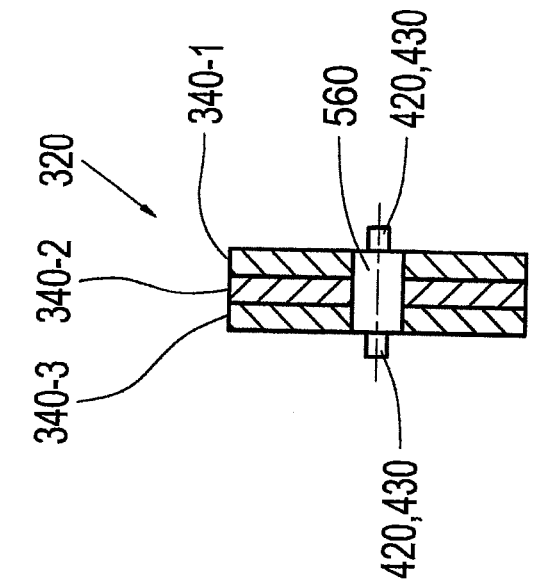
Figure 10A:
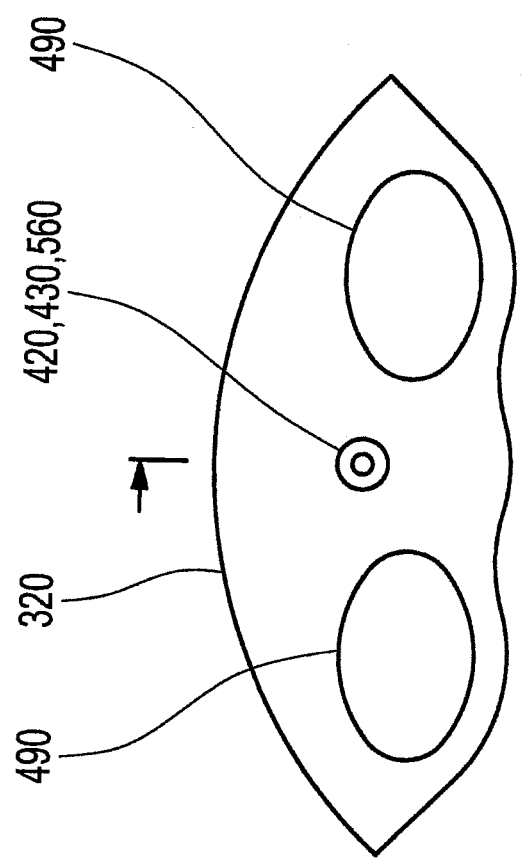
FIG. 10a is a top view of a damper mass of the tuned mass vibration damper shown in FIGS. 9a and 9b.

FIG. 10a shows a top view of one of the damper masses 320 such as are used in the tuned mass vibration damper 300 from FIGS. 9a and 9b. In these damper masses 320, the pin 560 which likewise serves as retaining structure 420 or as retaining projection 430 is inserted centrally between the running paths 490 for the rolling bodies 470, not shown in FIG. 10a. The pin 560 can be pressed into the damper mass 320 or can also be inserted with clearance as is illustrated in the cross-sectional view through the damper mass 320 along the section plane in FIG. 10a.

FIG. 10b shows a cross-sectional view through the damper mass 320 from FIG. 10a with pin 560 which, more precisely, is a stepped pin having at both ends thereof a cylindrically narrowing region which, as retaining structures 420 or retaining projections 430, can engage with the retaining recesses 450 of the guide component parts 350 in installed condition. In this case also, to facilitate production of the damper mass, the damper mass 320 is made of a plurality of individual damper masses 340-1, 340-2 and 340-3 and is joined by the pressed-in pin 560 to form the damper mass 320. In other words, FIGS. 10a and 10b show damper mass 320 with the pin 560 which also serves here to mechanically fasten the individual damper masses 340 to one another.

The pin 560 can be constructed in any shape in principle. For example, it can be realized in a round, oval, or rectangular shape with or without step. If the pin is to be used with clearance within the framework of the damper mass 320, it may possibly be advisable, or even necessary, to realize the pin in a stepped manner, i.e., with a step, so that the pin 560 is axially secured by the guide component parts. In this case, an outer diameter of the pin 560 should be adapted to prevent the pin 560 from slipping through the retaining recess 450 into the guide component parts 350. Alternatively, of course, pins without a step can also be axially secured by clamping washers, retaining rings, or the like.

Figure 11C:
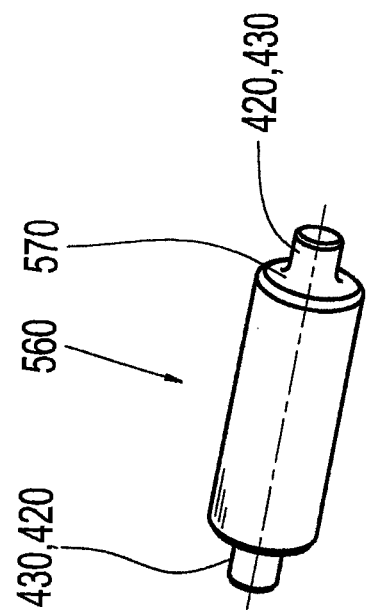
FIG. 11c is a perspective view of the pin from FIGS. 10a and 10b.
Figure 11B:
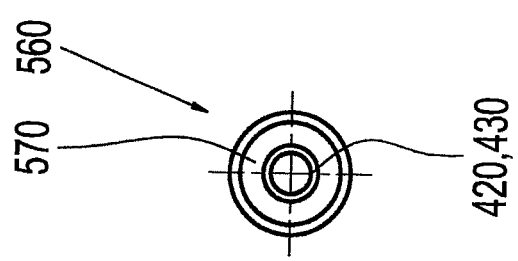
FIG. 11b is a top view of the pin.
Figure 11A:
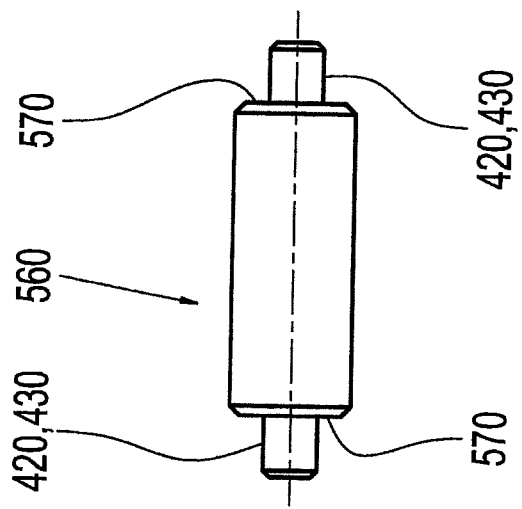
FIG. 11a is a side view of a pin.

FIG. 11a shows a side view of pin 560 which has the retaining structure 420 with retaining projection 430 at both sides, this retaining structure 420 having a smaller diameter than a central region of the pin 560, through which, for example, the individual damper masses 340 can be guided. Accordingly, there is a guide surface 57 on both sides of the pin which can be utilized for axially guiding the pin through the guide component parts 350.

Correspondingly, FIG. 11b shows a top view of the front side of the pin 560, while FIG. 11c shows a perspective view of the stepped variant of the pin 560.

FIGS. 12a, 12b and 12c show a top view, a sectional view and a perspective view of a further tuned mass vibration damper 300 according to an embodiment which differs from that shown in FIGS. 9a to 11c substantially in that the damper masses 320 now have the retaining recesses 450 as retaining structures 420 and the guide component parts 350 comprise the corresponding mating retaining structures 440 in the form of retaining projections 430. The retaining projections 430, i.e., the mating retaining structures 440, can be realized, for example, as guide rivets 580 by which the guide component parts 350 can be connected to one another so as to be fixed with respect to rotation relative to one another. This variant of the tuned mass vibration damper 300 is accordingly the reverse of the solution in the above-described variant from FIGS. 9a to 11c. The damper masses 320 are provided in this case with corresponding round or curved retaining recesses 450 which are also referred to as guide cutouts. In this case, when centrifugal force decreases, the damper masses 320 are suspended on the rivets or guide rivets 580, of which there are four in the present case, which are distributed along circumferential direction 330 and which form the corresponding retaining projections 430. They connect the guide component parts 350 to one another as is also shown, for example, in FIG. 13. In this variant of the tuned mass vibration damper 300, the spacer pieces or spacer rivets 370 which form the spacer connection 360 between the guide component parts 350 can be dispensed with or omitted because the connection of the two guide component parts to one another can already be brought about by the guide rivets 580, i.e., by the corresponding mating retaining structures 440.

Figure 13:
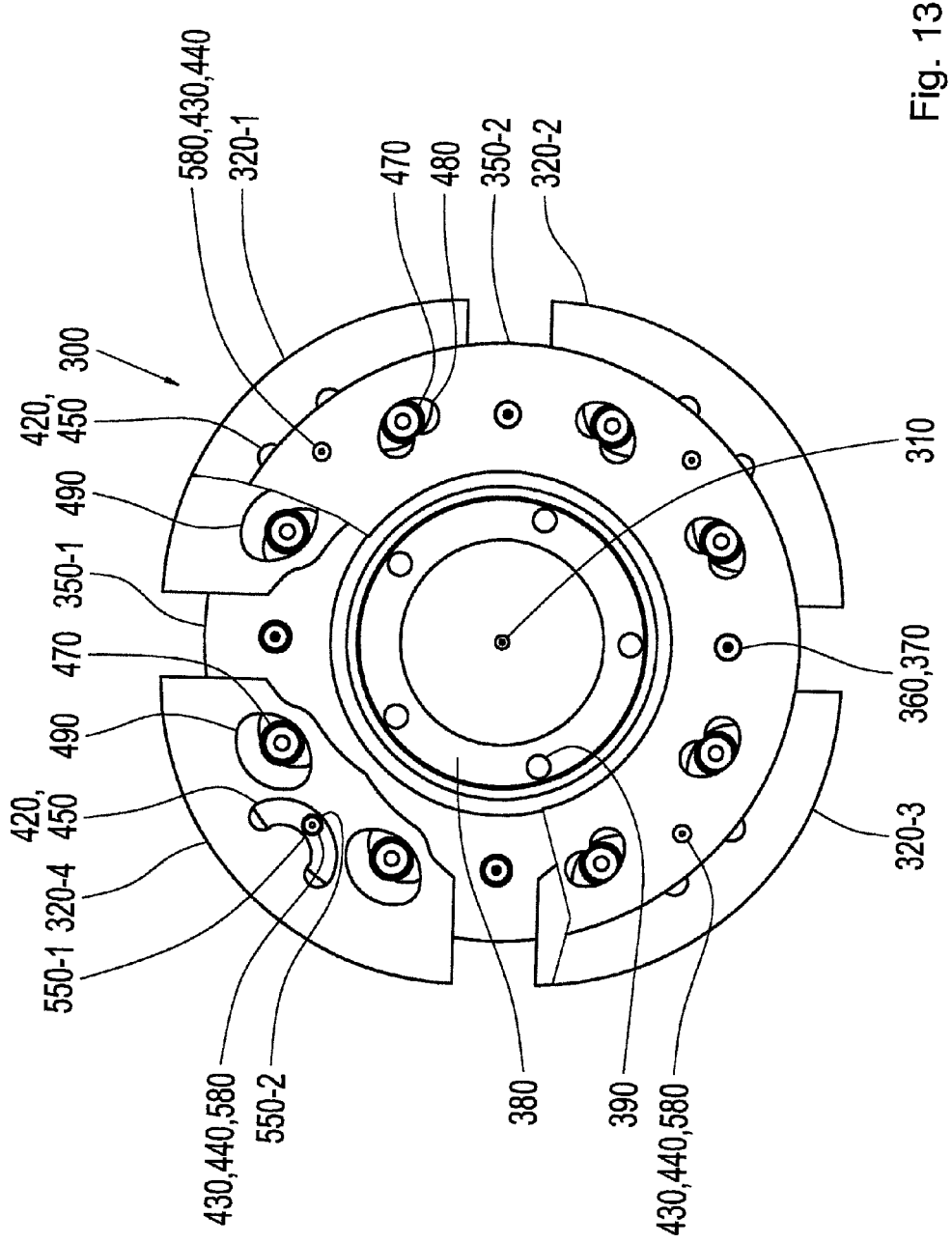
FIG. 13 is a fragmentary elevational view of the tuned mass vibration damper shown in FIGS. 12a to 12c in which a guide component part is shown in section.

FIG. 13 shows a fragmentary elevational view of the tuned mass vibration damper 300 from FIGS. 12a to 12c in which the second guide component part 350-2 is shown in partial section. The section is drawn precisely such that FIG. 13 shows a view of the damper mass 320-4 with its retaining recess 450, i.e., its retaining structure 420. In this case also, the retaining recess 450 again has an at least partially curved outer contour 550-1, 550-2 at a radially outer side and a radially inner side. In contrast to the embodiment described above, however, the outer contours are curved radially inward because they are now implemented in the damper masses 320. However, the fact that the retaining recesses 450 are implemented in the damper masses 320 makes it possible not only to economize on the spacer connections 360 but also optionally to configure them in a simpler manner. Accordingly, in this instance again, they are substantially circular segment-shaped or elliptical segment-shaped, but additionally can have a substantially constant width along their length. The width is the shortest distance of a straight line joining two points at the (outer) contour 550 of the retaining recess 450 which extends through a possible location of a center point of the retaining projection 430. This makes it possible optionally to further simplify production of a tuned mass vibration damper 300 according to an embodiment.

In this case also, the damper masses 320 engage via the retaining recesses 450 at the retaining projections 430, i.e., the guide rivets 580, and are released from their position only after a delay. Again, the momentum which can be responsible for unfavorable acoustics is also reduced in this way.

FIGS. 14a, 14b and 14c show a view of a further tuned mass vibration damper 300 which is comparable to FIGS. 12a, 12b and 12c in which the guide component parts 350 are used to form the mating retaining structure 440, i.e., the tabs 590 corresponding to the retaining projections 430, instead of the guide rivet 580. This is made possible because the guide component parts 350 in the embodiment example shown here are produced from a sheet-like material. In this case, the retaining projections 430 can be shaped by corresponding stamping and deformation of the sheet-like material. In this case, the tabs 590 project into the retaining recesses 450 in the damper masses 320.

In other words, in the embodiment form of a tuned mass vibration damper 300 shown in FIGS. 14a to 14c, the guide rivets 580 of the previous embodiment form are replaced by stamped out portions, i.e., the tabs 590 in the two guide component parts 350, also referred to as guide strips. Of course, it is also possible to provide only one guide component part 350 with a corresponding tab or guide strip in other embodiment examples. The tabs 590 can be formed, for example, in one step by deep drawing or stamping.

Figure 15:
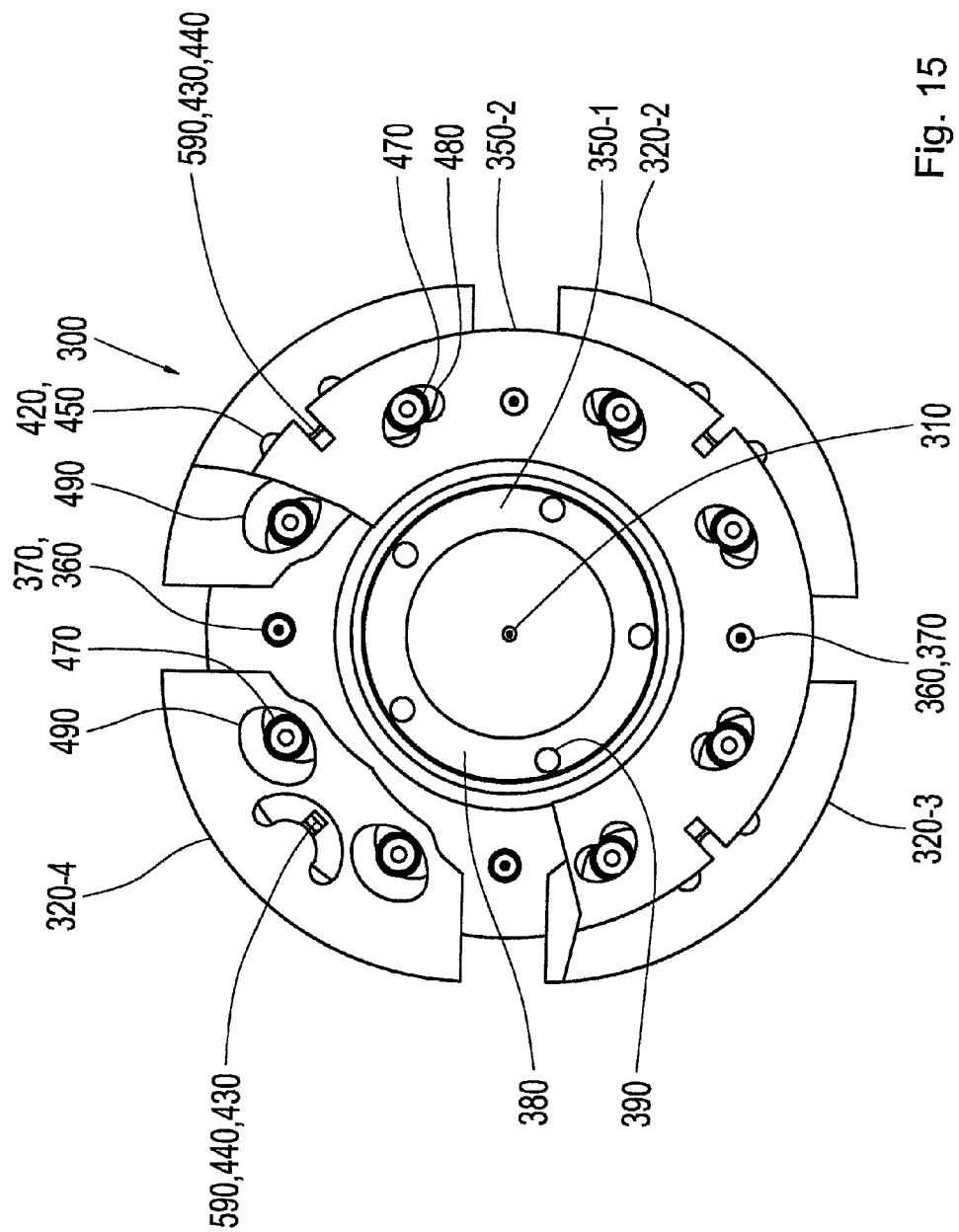
FIG. 15 is a fragmentary elevational view of the tuned mass vibration damper shown in FIGS. 14a to 14c in which a guide component part is shown in section.

FIG. 15 shows a view of the tuned mass vibration damper 300 comparable to FIG. 13 in which the tabs 590 are shown again instead of guide rivets 580. In this case too, for better clarity the second guide component part 350 is again shown in section so that the damper mass 320-4 is visible.

Figure 14:
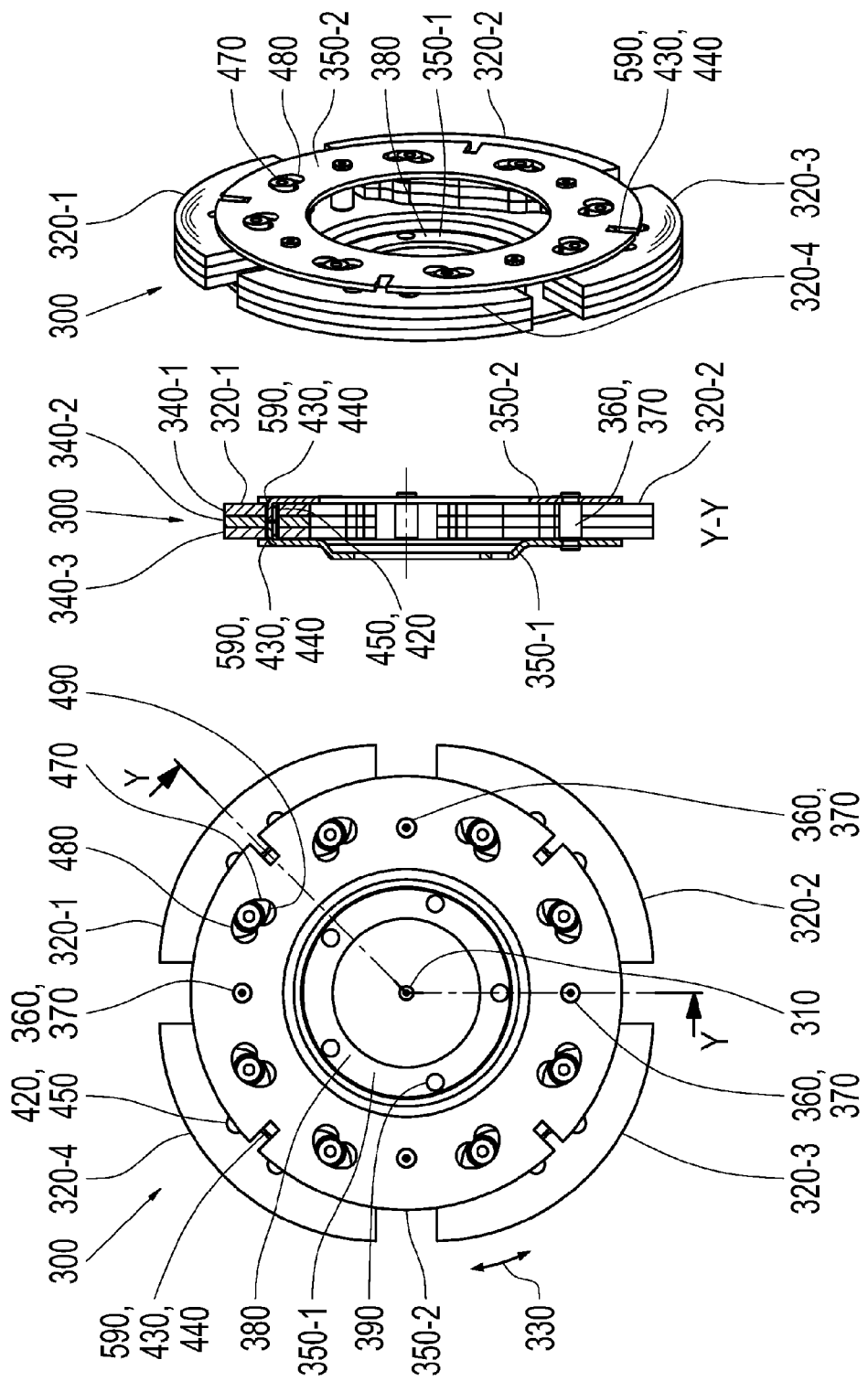
FIG. 14a is a top view of a tuned mass vibration damper.
FIG. 14b is a cross-sectional view through the tuned mass vibration damper shown in FIG. 14a according to an angled section plane shown therein.
FIG. 14c is a perspective and isometric view of the tuned mass vibration damper shown in FIGS. 14a and 14b.

Finally, FIG. 16 is a perspective view of the two guide component parts 350-1, 350-2 such as those used in the embodiment example shown in FIGS. 14a to 15.

Although the retaining projections 430 are formed substantially in their entirety by the tabs 590 in the embodiment example described here, they can, of course, also be formed only partially by the tabs 590 in other embodiment examples. Also, with respect to this embodiment example as well as the embodiment examples described above, the variants mentioned above are referenced with respect to further possible configurations.

The embodiment examples and individual features thereof disclosed in the preceding description, appended claims and accompanying drawings can be significant and can be implemented individually as well as in any combination for realizing an embodiment example in its various refinements.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A tuned mass vibration damper for a drivetrain of a motor vehicle configured to damp a vibration component of a rotational movement around an axis of rotation comprising:

at least one damper mass configured to execute an oscillation depending on the rotational movement to damp the vibration component; and at least one guide component part configured to movably guide the at least one damper mass to enable the oscillation thereof;

wherein the damper mass comprises:

a retaining component part that is at least partially arranged in a receiving recess of the damper mass, the retaining component part having at least one retaining structure and the at least one guide component part having at least one mating retaining structure configured and arranged to limit a movement of the at least one damper mass relative to the at least one guide component part such that the retaining structure comes in contact with the mating retaining structure;

wherein the at least one damper mass is configured to drive the retaining component part during a movement of the damper mass along a circumferential direction and to allow a relative movement of the retaining component part with respect to the damper mass which results in a change in a radial distance of the retaining structure from the axis of rotation; and wherein the at least one damper mass and the at least one guide component part are configured to prevent the retaining structure and the mating retaining structure from coming in contact with one another when an upper threshold speed is exceeded, wherein the at least one damper mass is guided relative to the at least one guide component part by at least one rolling body that guided on a running path of the at least one guide component part and of the at least one damper mass, wherein the retaining structure and the mating retaining structure or the retaining structure and at least one guide component part are configured and arranged to prevent the at least one rolling body from striking an end of a running path of the respective rolling body.

2. The tuned mass vibration damper according to claim 1, wherein the at least one damper mass and the at least one guide component part are configured to allow the retaining structure and the mating retaining structure to make contact when a speed falls below the upper threshold speed or a lower threshold speed, the lower threshold speed differing from the upper threshold speed.

3. The tuned mass vibration damper according to claim 2, comprising at least two damper masses arranged in an offset manner in the circumferential direction, wherein the retaining structure and the mating retaining structure are configured and arranged such that a contact between two damper masses, which are adjacent along the circumferential direction, is prevented by the retaining structure and mating retaining structure coming in contact with one another when a speed falls below the upper threshold speed or lower threshold speed.

4. The tuned mass vibration damper according to claim 1, wherein the retaining structure comprises a retaining projection, and the mating retaining structure comprises a retaining recess, or wherein the retaining structure comprises a retaining recess and the mating structure comprises a retaining projection.

5. The tuned mass vibration damper according to claim 4, wherein the retaining recess has a first stop region along a circumferential direction along a predetermined rotational direction and a second stop region opposite the first stop region along the circumferential direction, wherein the first stop region and second stop region are configured asymmetrically.

6. A tuned mass vibration damper, for a drivetrain of a motor vehicle configured to damp a vibration component of a rotational movement around an axis of rotation configured to damp a rotational movement with the predetermined rotational direction around the axis of rotation, comprising:

at least one damper mass configured to execute an oscillation depending on the rotational movement to damp the vibration component; and at least one guide component part configured to movably guide the at least one damper mass to enable the oscillation thereof;

wherein the damper mass comprises:
a retaining component part that is at least partially arranged in a receiving recess of the damper mass, the retaining component part having at least one retaining structure and the at least one guide component part having at least one mating retaining structure configured and arranged to limit a movement of the at least one damper mass relative to the at least one guide component part such that the retaining structure comes in contact with the mating retaining structure;

wherein the at least one damper mass is configured to drive the retaining component part during a movement of the damper mass along a circumferential direction and to allow a relative movement of the retaining component part with respect to the damper mass which results in a change in a radial distance of the retaining structure from the axis of rotation; and wherein the at least one damper mass and the at least one guide component part are configured to prevent the retaining structure and the mating retaining structure from coming in contact with one another when an upper threshold speed is exceeded, wherein the retaining structure comprises a retaining projection, and the mating retaining structure comprises a retaining recess, or wherein the retaining structure comprises a retaining recess and the mating structure comprises a retaining projection, wherein the retaining recess has a first stop region along a circumferential direction along a predetermined rotational direction and a second stop region opposite the first stop region along the circumferential direction, wherein the first stop region and second stop region are configured asymmetrically, wherein the first stop region is arranged with respect to the second stop region and the predetermined rotational direction such that the retaining projection can come in contact with the first stop region during an acceleration of the rotational movement due to an inertia of the at least one damper mass relative to the at least one guide component part, and that during a retardation of the rotational movement due to the inertia of the at least one damper mass, the retaining projection can come in contact with the second stop region, wherein a contour of the first stop region has a greater angle than a contour of the second stop region with respect to a radial direction.

7. The tuned mass vibration damper according to claim 6, wherein the contour of the second stop region has an undercut with respect to the radial direction.

8. A tuned mass vibration damper for a drivetrain of a motor vehicle configured to damp a vibration component of a rotational movement around an axis of rotation comprising:

at least one damper mass configured to execute an oscillation depending on the rotational movement to damp the vibration component; and at least one guide component part configured to movably guide the at least one damper mass to enable the oscillation thereof;

wherein the damper mass comprises:
a retaining component part that is at least partially arranged in a receiving recess of the damper mass, the retaining component part having at least one retaining structure and the at least one guide component part having at least one mating retaining structure configured and arranged to limit a movement of the at least one damper mass relative to the at least one guide component part such that the retaining structure comes in contact with the mating retaining structure;

wherein the at least one damper mass is configured to drive the retaining component part during a movement of the damper mass along a circumferential direction and to allow a relative movement of the retaining component part with respect to the damper mass which results in a change in a radial distance of the retaining structure from the axis of rotation; and wherein the at least one damper mass and the at least one guide component part are configured to prevent the retaining structure and the mating retaining structure from coming in contact with one another when an upper threshold speed is exceeded, wherein the retaining structure comprises a retaining projection, and the mating retaining structure comprises a retaining recess, or wherein the retaining structure comprises a retaining recess and the mating structure comprises a retaining projection, wherein the retaining structure has the retaining projection and the mating retaining structure has the retaining recess, and wherein the retaining recess is arranged at a radially outer contour of the at least one guide component part.

* * * * *